US011210525B2

United States Patent
Lee et al.

(10) Patent No.: US 11,210,525 B2
(45) Date of Patent: Dec. 28, 2021

(54) METHOD AND TERMINAL FOR PROVIDING CONTENT

(71) Applicant: SAMSUNG ELECTRONICS CO., LTD., Suwon-si (KR)

(72) Inventors: Gun-hee Lee, Anyang-si (KR); Kyung-su Kim, Seoul (KR); Hyun-soo Choi, Seoul (KR); Sung-jin Kim, Yongin-si (KR); Ju-hee Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/643,778

(22) PCT Filed: Sep. 14, 2018

(86) PCT No.: PCT/KR2018/010823
§ 371 (c)(1),
(2) Date: Mar. 2, 2020

(87) PCT Pub. No.: WO2019/054792
PCT Pub. Date: Mar. 21, 2019

(65) Prior Publication Data
US 2020/0210710 A1  Jul. 2, 2020

Related U.S. Application Data

(63) Continuation of application No. PCT/KR2018/010823, filed on Sep. 14, 2018.

(30) Foreign Application Priority Data

Sep. 15, 2017  (KR) .................. 10-2017-0118850

(51) Int. Cl.
| G06K 9/00 | (2006.01) |
| G06K 9/62 | (2006.01) |
| G06N 3/08 | (2006.01) |

(52) U.S. Cl.
CPC ..... *G06K 9/00744* (2013.01); *G06K 9/00718* (2013.01); *G06K 9/00765* (2013.01); *G06K 9/6256* (2013.01); *G06N 3/08* (2013.01)

(58) Field of Classification Search
None
See application file for complete search history.

(56) References Cited

U.S. PATENT DOCUMENTS 9,208,227 B2  12/2015  Kashima et al.
9,497,391 B2  11/2016  Furumura et al.
(Continued)

FOREIGN PATENT DOCUMENTS

CN  102170591 A   8/2011
CN  102209184 A  10/2011
(Continued)

OTHER PUBLICATIONS

Communication dated Jun. 15, 2020 issued by the European Patent Office in Application No. 18857308.3.
(Continued)

*Primary Examiner* — Leon Flores
(74) *Attorney, Agent, or Firm* — Sughrue Mion, PLLC

(57) ABSTRACT

According to the present disclosure, an artificial intelligence (AI) system and a method of providing content according to an application of the AI system are provided. The method includes: obtaining one or more images included in the content; generating additional content for guiding user information, the additional content corresponding to the one or more images, based on feature information extracted from the one or more images; when receiving a request for
(Continued)

reproducing the content, synchronizing the generated additional content with the one or more images; and reproducing the content and the additional content, according to a result of the synchronizing.

15 Claims, 17 Drawing Sheets

(56) References Cited

U.S. PATENT DOCUMENTS

| | | | |
|---|---|---|---|
| 9,704,279 | B2 | 7/2017 | Ooshima |
| 9,898,666 | B2 | 2/2018 | Kang et al. |
| 2010/0077290 | A1 | 3/2010 | Pueyo |
| 2011/0214141 | A1 | 9/2011 | Oyaizu |
| 2012/0324518 | A1 | 12/2012 | Thomas et al. |
| 2014/0351838 | A1 | 11/2014 | Dunmore et al. |
| 2015/0121409 | A1 | 4/2015 | Zhang et al. |
| 2015/0271571 | A1 | 9/2015 | Laksono et al. |
| 2016/0140146 | A1 | 5/2016 | Wexler et al. |
| 2017/0270970 | A1* | 9/2017 | Ho ................. G06F 16/5854 |

FOREIGN PATENT DOCUMENTS

| | | | |
|---|---|---|---|
| CN | 104113768 | A | 10/2014 |
| CN | 104333809 | A | 2/2015 |
| CN | 105303904 | A | 2/2016 |
| CN | 105898561 | A | 8/2016 |
| JP | 2011-077758 | A | 4/2011 |
| JP | 5646033 | B2 | 12/2014 |
| JP | 2015-115892 | A | 6/2015 |
| JP | 2016-189158 | A | 11/2016 |
| KR | 1020140145053 | A | 12/2014 |
| KR | 10-1516995 | B1 | 5/2015 |
| KR | 10-1523349 | B1 | 5/2015 |
| KR | 10-2016-0090593 | A | 8/2016 |
| WO | 2016077834 | A1 | 5/2016 |

OTHER PUBLICATIONS

International Search Report and Written Opinion (PCT/ISA/210 and PCT/ISA/237), dated Jan. 18, 2019 by International Searching Authority in International Application No. PCT/KR2018/010823.
Communication dated Jun. 24, 2021 issued by the China National Intellectual Property Administration in Chinese Application No. 201880060004.5.

* cited by examiner

METHOD AND TERMINAL FOR PROVIDING CONTENT

TECHNICAL FIELD

The disclosure relates to a method of providing content, a terminal for providing content, and a recording medium having recorded thereon a program for executing the method of providing content on a computer.

BACKGROUND ART

An artificial intelligence (AI) system is a computer system with human level intelligence, and unlike a previous rule-based smart system, the AI system is a system that trains itself, decides, and becomes increasingly smarter. The more the AI system is used, the higher the recognition rate of the AI system and the AI system may more accurately understand the user's taste. Thus, the previous rule-based smart system has been gradually replaced by a deep learning-based AI system.

AI technologies are composed of machine learning (for example, deep learning) and element technologies using the machine learning.

Machine learning is an algorithm technology that classifies/learns characteristics of input data on its own. The element technology is a technology that simulates functions of the human brain, such as recognition, determination, etc., by using machine learning algorithms, such as deep learning, etc., and includes technical fields of linguistic understanding, visual comprehension, inference/prediction, knowledge representation, operation control, etc.

AI technology is applied to various fields as follows. Linguistic understanding is a technology to recognize and apply/process human language/characters and includes processing of natural language, machine translation, a conversation system, query response, speech recognition/synthesis, etc. Visual comprehension is a technology to recognize and process objects as in human vision and includes object recognition, object detection, image search, human recognition, scene understanding, spatial understanding, image enhancement, etc. Inference prediction is a technology to examine and logically infer and predict information and includes inference based on knowledge/probabilities, optimization prediction, preference-based planning, recommendation, etc. Knowledge representation is a technology to automatically process human experience data into knowledge data and includes knowledge establishment (data generation/classification), knowledge management (data usage), etc. Operation control is a technology to control autonomous driving of a vehicle and motions of a robot and includes motion control (navigation, collision avoidance, driving), manipulation control (behavior control), etc.

DESCRIPTION OF EMBODIMENTS

Technical Problem

The disclosure provides a method of providing content, a terminal, and a recording medium, whereby, when content is reproduced, additional content including reaction information corresponding to one or more images of the content is provided in synchronization with the one or more images, and thus, when the content is repeatedly reproduced, deterioration of user immersion is prevented.

Solution to Problem

The present disclosure relates to an artificial intelligence (AI) system and an application thereof, the AI system simulating functions of the human brain, such as recognition, determination, etc., by using machine learning algorithms, such as deep learning, etc. More particularly, the present disclosure relates to an artificial intelligence (AI) system and a method of providing content according to an application of the AI system, the method including: obtaining one or more images included in the content; generating additional content for guiding user information, the additional content corresponding to the one or more images, based on feature information extracted from the one or more images; when receiving a request for reproducing the content, synchronizing the generated additional content with the one or more images; and reproducing the content and the additional content, according to a result of the synchronizing.

BEST MODE

Figure 1:
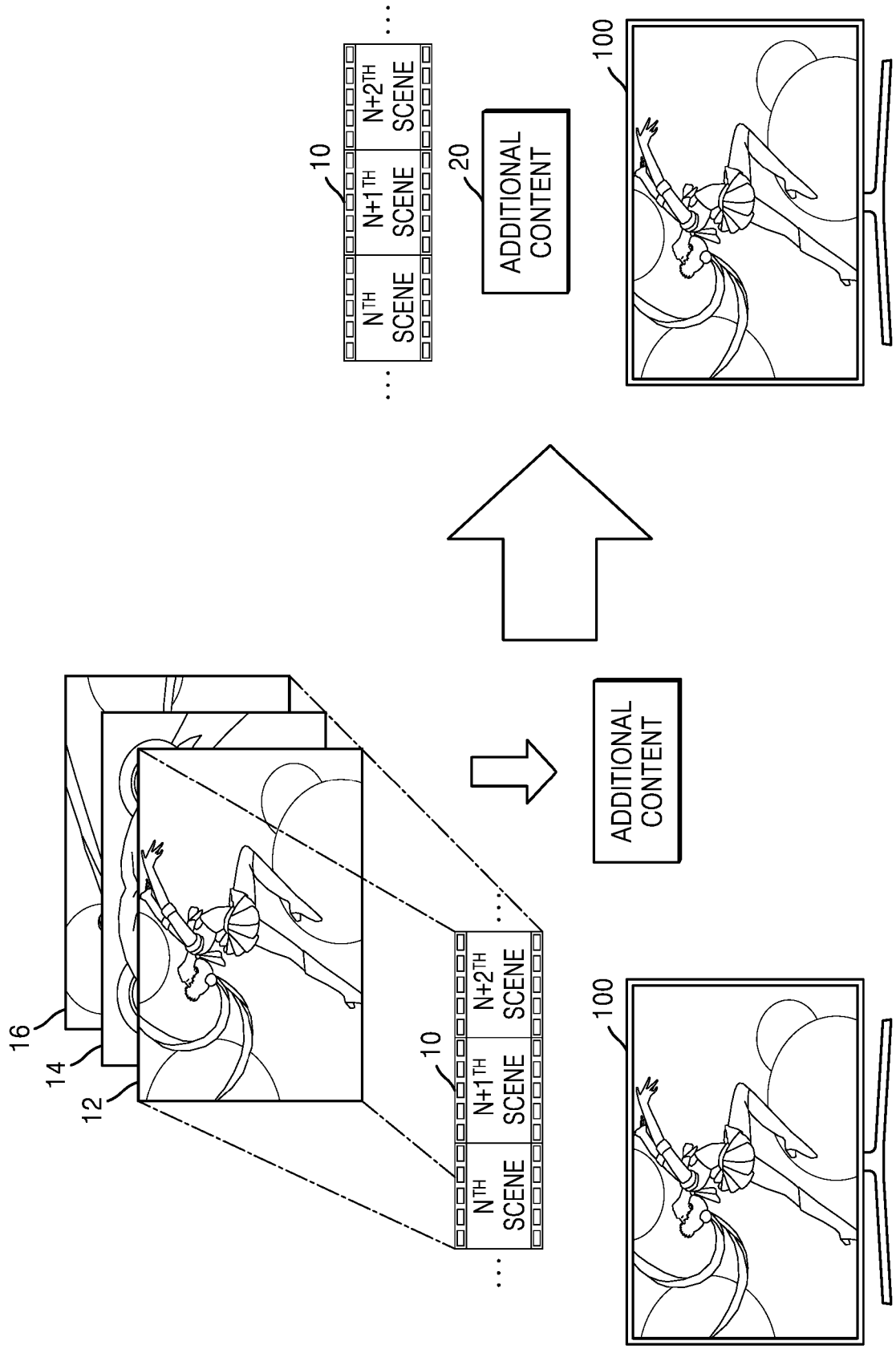
FIG. 1 is a conceptual view for describing a method, performed by a terminal, of providing content, according to an embodiment.

According to an embodiment, a method of providing content includes: obtaining one or more images included in the content; generating additional content for guiding user information, the additional content corresponding to the one or more images, based on feature information extracted from the one or more images; when receiving a request for reproducing the content, synchronizing the generated additional content with the one or more images; and reproducing the content and the additional content, according to a result of the synchronizing.

The generating of the additional content may include: recognizing an object included in the one or more images, based on the extracted feature information; obtaining, from the one or more images, information about a location of the recognized object and information about a change of the recognized object between the one or more images; and determining reaction information corresponding to the one or more images, based on the obtained information about the location of the recognized object and the obtained information about the change of the recognized object between the one or more images.

The generating of the additional content may include: determining a scene category of the one or more images, based on the extracted feature information, by using a pre-generated learning network model; and obtaining, from a reaction information database, reaction information corresponding to the determined scene category.

The scene category of the one or more images may be classified according to at least one of a type of an object included in the one or more images and a type of an activity performed by the object.

The method may further include obtaining information about a genre of the content, and the determining of the scene category of the one or more images may include determining the scene category of the one or more images based on the extracted feature information and the information about the genre of the content, by using a pre-generated learning network model.

The method may further include obtaining profile information including at least one of a gender, an age, and preference of a user, and the obtaining of the reaction information corresponding to the determined scene category of the image may include obtaining the reaction information corresponding to the one or more images based on the recognized scene category and the profile information.

The generating of the additional content may include determining reaction information corresponding to the one or more images, based on the extracted feature information, by using a pre-generated learning network model.

The method may further include: obtaining user feedback information with respect to the additional content that is reproduced in synchronization with the content; determining a weight for each of a plurality of pieces of pre-stored reaction information, based on the obtained user feedback information; and modifying and refining, based on the determined weight, reaction information corresponding to the one or more images, from among the plurality of pieces of pre-stored reaction information.

The method may further include: obtaining history information of reaction information selected with respect to the one or more images; determining a weight for each of a plurality of pieces of pre-stored reaction information, based on the history information; and modifying and refining, based on the determined weight, the reaction information corresponding to the one or more images, from among the plurality of pieces of pre-stored reaction information, wherein the weights for the plurality of pieces of pre-stored reaction information are set to be lower as the number of times the plurality of pieces of pre-stored reaction information are previously selected is decreased.

The method may further include, when reaction information is sound data, selecting a sound model corresponding to the reaction information from a sound database including a plurality of sound models, and the reproducing of the content and the additional content may include reproducing the additional content, to which the selected sound model is applied, in synchronization with the one or more images.

According to an embodiment, a terminal for providing content may include: a memory storing one or more instructions; a display; and a processor configured to execute the one or more instructions stored in the memory to: obtain one or more images included in the content; generate additional content including reaction information corresponding to the one or more images, based on feature information extracted from the one or more images; when a request for reproducing the content is received, reproduce the generated additional content in synchronization with the one or more images; and control the display to display the one or more images.

MODE OF DISCLOSURE

The terms used in this specification will be briefly described and embodiments of the disclosure will be described in detail.

The terms used in the disclosure are selected from among common terms that are currently widely used in consideration of their function in the disclosure. However, the terms may be different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that the terms "comprises" and/or "comprising" used herein do not preclude the presence or addition of one or more other features or components, unless there are specific descriptions contrary thereto. The term "unit" used in the specification means a software component or hardware components such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units," or may be divided into additional components and "units."

Embodiments of the disclosure will now be described more fully with reference to the accompanying drawings for one of ordinary skill in the art to be able to perform the disclosure without any difficulty. The disclosure may, however, be embodied in many different forms and should not be construed as being limited to the embodiments of the disclosure set forth herein. Also, parts in the drawings unrelated to the detailed description are omitted to ensure clarity of the disclosure. Like reference numerals in the drawings denote like elements.

FIG. 1 is a conceptual view for describing a method, performed by a terminal 100, of providing content, according to an embodiment.

Referring to FIG. 1, the terminal 100 may obtain content 10 including one or more images 12, 14, and 16. The content 10 according to an embodiment may include, for example, multimedia content, such as cartoons, movies, dramas, etc. An image included in the content indicates a portion of the content that is displayed on a screen unit, and in this specification, an image may be used as having the same meaning as a frame, etc. Also, a scene category of the image may be determined based on a type of an object included in the image or an activity performed by the object. For example, the scene category of the image may be determined as a food image, a robot image, etc., based on the type of the object, or as a transformation image, a playing image, a singing image, etc., based on the activity of the object.

When reproducing the content 10, the terminal 100 according to an embodiment may generate additional content 20 including reaction information about the one or more images 12, 14, and 16 of the content 10. The reaction information includes content, such as evaluation, empathy, etc., with respect to the one or more images 12, 14, and 16. By providing the reaction information when reproducing the one or more images 12, 14, and 16, user immersion for the content 10 may be increased. Also, the reaction information may be provided in the form of at least one of sound data, text data, and image data.

For example, the terminal 100 may generate the additional content including the reaction information in the form of the sound data of "nice!" with respect to the one or more images 12, 14, and 16. Also, the terminal 100 may generate additional content including identification information of the one or more images 12, 14, and 16 together with the reaction information, so that the reaction information of "nice!" may be reproduced in synchronization with the one or more images 12, 14, and 16. However, it is only an embodiment, and the identification information of the one or more images 12, 14, and 16 corresponding to the reaction information may be provided as separate metadata.

The terminal 100 according to an embodiment may use a learning network model in order to determine the reaction information corresponding to the one or more images 12, 14, and 16. Here, the learning network model may indicate a group of algorithms for determining the scene category of the one or more images 12, 14, and 16 or determining the reaction information corresponding to the one or more images 12, 14, and 16 by extracting and using various features in the one or more images 12, 14, and 16 by using results of statistical mechanical learning. Also, the learning network model may be realized as software, engines, or the like for executing the described group of algorithms. The learning network model realized as software, engines, or the like may be executed by a processor in the terminal 100 or a processor of a server (not shown).

For example, the terminal 100 may obtain the reaction information corresponding to the one or more images 12, 14, and 16 as output data, by applying the one or more images 12, 14, and 16 or at least one of the one or more images 12, 14, and 16 as input data of the learning network model. This aspect will be described in more detail below with reference to FIGS. 4 through 8.

The terminal 100 may include, but is not limited to, a smartphone, a tablet personal computer (PC), a PC, a smart television (TV), a cellular phone, a personal digital assistant (PDA), a laptop, a media player, a micro server, an electronic book terminal, a digital broadcasting terminal, a kiosk, an MP3 player, a digital camera, a home appliance device, and other mobile or non-mobile computing devices. Also, the terminal 100 may include wearable devices, such as a watch, glasses, a hair band, a ring, etc. having communication functions and data processing functions.

Figure 2:
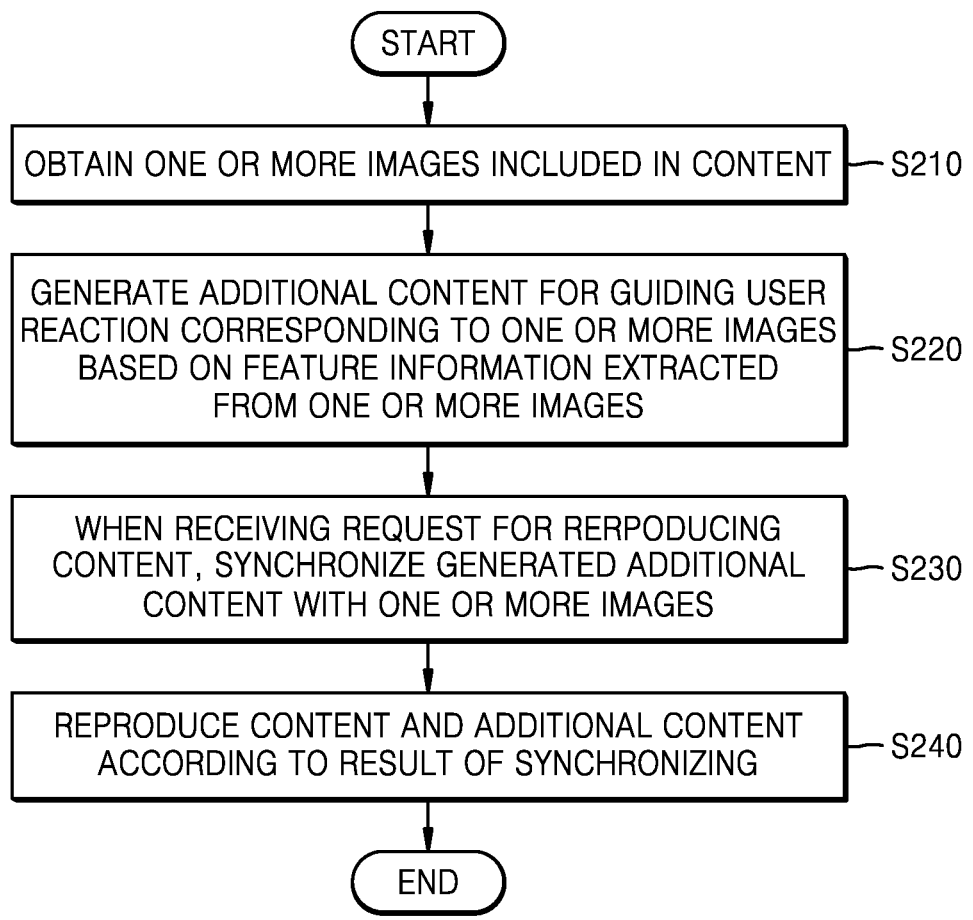
FIG. 2 is a flowchart of a method, performed by a terminal, of providing content, according to an embodiment.

FIG. 2 is a flowchart of a method, performed by a terminal, of providing content, according to an embodiment.

In operation S210, the terminal may obtain one or more images included in the content.

The terminal may obtain one or more images included in content that is stored in the terminal. For example, the terminal may obtain the one or more images included in the pre-stored content, by executing a video reproducing application, etc.

According to another example, the terminal may receive an image from an external server. Here, the external server may include at least one of a social network server, a cloud server, a web server, and a content providing server. For example, when at least one of a web application, a search application, and a social network service (SNS) is executed by the terminal, the terminal may obtain one or more images included in content, by accessing an external server supporting the application executed by the terminal.

In operation S220, the terminal may generate additional content for guiding user reaction corresponding to the one or more images, based on feature information extracted from the one or more images.

The terminal according to an embodiment may determine the reaction information corresponding to the one or more images by using a learning network model.

For example, the terminal may use the learning network model to detect the feature information of the one or more images and determine the reaction information corresponding to the one or more images based on the detected feature information. According to another example, the terminal may determine a scene category of the one or more images by detecting the feature information of the one or more images by using the learning network model. When the scene category of the one or more images is determined, the terminal may obtain the reaction information corresponding to the one or more images, from a reaction information database that is pre-stored. The reaction information database may store a plurality of pieces of reaction information classified for each scene category of the image.

Here, the feature information of the image may indicate information which may be applied as an input parameter of the learning network model. The feature information of the image may include a color, an edge, a polygon, saturation, brightness, color temperature, blur, sharpness, contrast, etc., but is not limited thereto. According to another example, the feature information of the image may include sound data (for example, a theme song or a dialogue) in content corresponding to the image.

When the reaction information corresponding to the one or more images is determined, the terminal may generate additional content including the reaction information. The additional content may include identification information of the at least image corresponding to the reaction information as synchronization information, so that the one or more images and the additional content are displayed in synchronization. However, it is only an embodiment. The synchronization information may be separately provided as metadata of the additional content.

In operation S230, when a request for reproducing the content is received, the terminal may synchronize the generated additional content with the one or more images. When the request for reproducing the content is received after the additional content is generated, the terminal may synchronize reproduction times of the content and the additional content.

In operation S240, the terminal may reproduce the content and the additional content according to a result of the synchronization.

Thus, the one or more images included in the content and the additional content may be reproduced in synchronization with each other. For example, when the additional content includes sound data of "Nice!" that is the reaction information with respect to the one or more images, the terminal may reproduce the sound data of "Nice!" in synchronization with the one or more images, at a time point in which the one or more images is reproduced.

When the number of times the same content is reproduced is increased, the terminal may modify and refine the additional content in order to prevent repeated reproduction of the same additional content. This aspect will be described in detail below with reference to FIG. 5.

Figure 3:
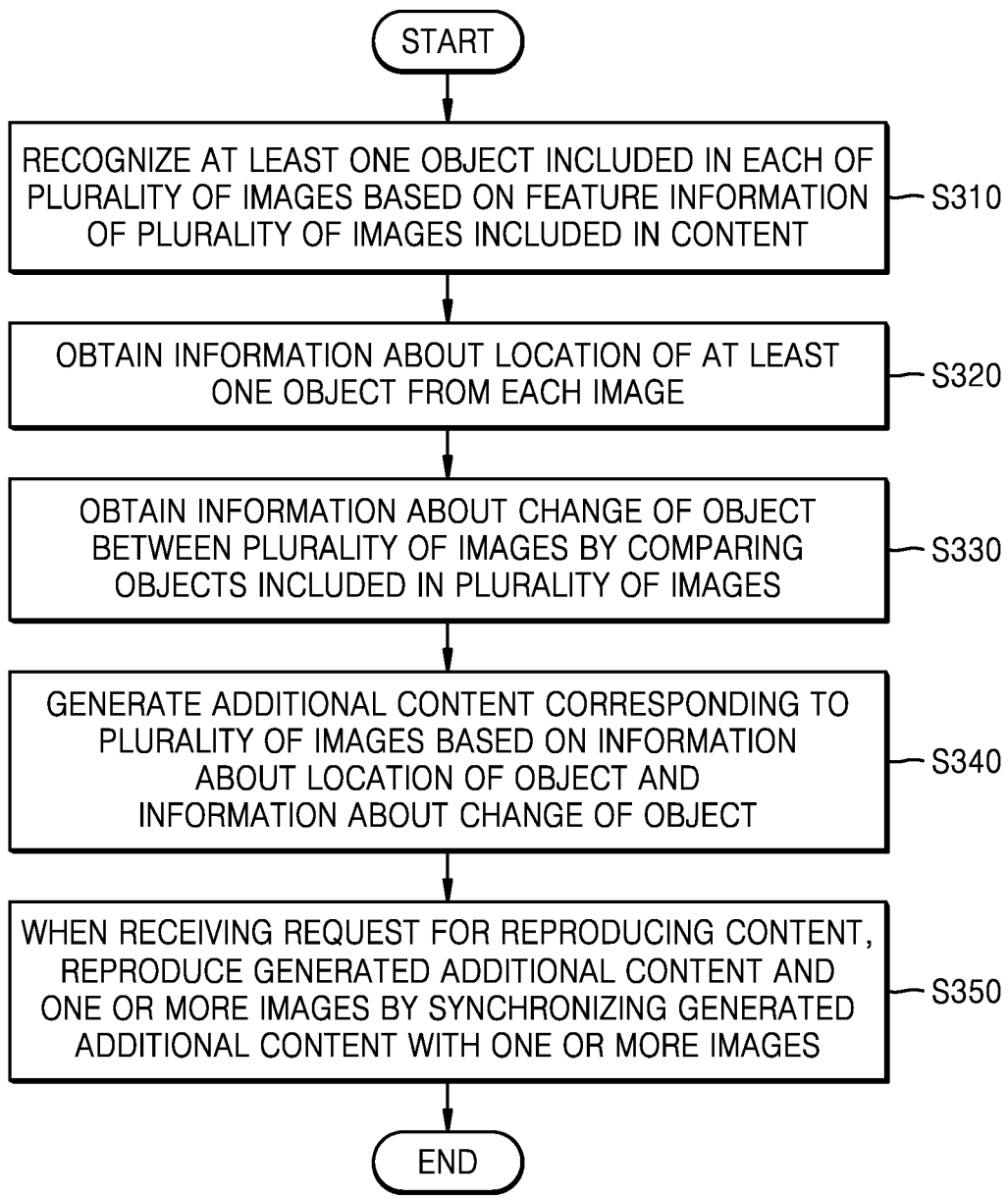
FIG. 3 is a flowchart of a method, performed by a terminal, of generating additional content based on information about a change of an object and information of a location of an object, the information being obtained from one or more images, according to an embodiment.

FIG. 3 is a flowchart of a method, performed by a terminal, of generating additional content based on information about a change of an object obtained from one or more images and information about a location of the object, according to an embodiment.

In operation S310, the terminal may recognize at least one object included in each of a plurality of images, based on feature information of the plurality of images included in content.

For example, the terminal may recognize the at least one object included in each of the plurality of images, by comparing information about a color, a polygon, etc. that is obtained as the feature information of each image with pre-stored information about colors, polygons, etc. of a plurality of objects. As another example, the terminal may recognize the object included in each of the plurality of images, by applying each image to a learning network model trained with respect to a feature for each type of an object, as input data.

In operation S320, the terminal may obtain information about a location of the at least one object from each image.

The information about the location of the at least one object may be obtained as information of coordinates of the at least one object on a two-dimensional plane. However, it is only an embodiment, and the information about the location of the at least one object is not limited thereto. As another example, the information about the location of the at least one object may be obtained as information of relative location values of a plurality of objects included in the image.

In operation S330, the terminal may obtain information about a change of an object between a plurality of images by comparing objects included in the plurality of images. The information about the change of the object may include information about a change of an object between predetermined images, in terms of a shape, a location, a color, etc. Also, the information about the change of the object may include information about an event where a new object is added to a predetermined image or an event where an object included in a previous image disappears in a predetermined image.

In operation S340, the terminal may generate the additional content corresponding to the plurality of images based on the information about the location of the object and the information about the change of the object.

The terminal according to an embodiment may obtain reaction information corresponding to the plurality of images as output data, by applying, as input data, the information about the location of the object and the information about the change of the object to a learning network model trained for outputting reaction information.

The terminal according to another embodiment may obtain a scene category of each of the plurality of images as output data by applying, as input data, the information about the location of the object and the information about the change of the object to a learning network model trained for determining a scene category of an image. The terminal may determine the reaction information corresponding to each image, by comparing the scene category of each image with a pre-stored reaction information database.

In operation S350, when a request for reproducing content is received, the terminal may reproduce the generated additional content and the one or more images by synchronizing the generated additional content and the one or more images.

Figure 4:
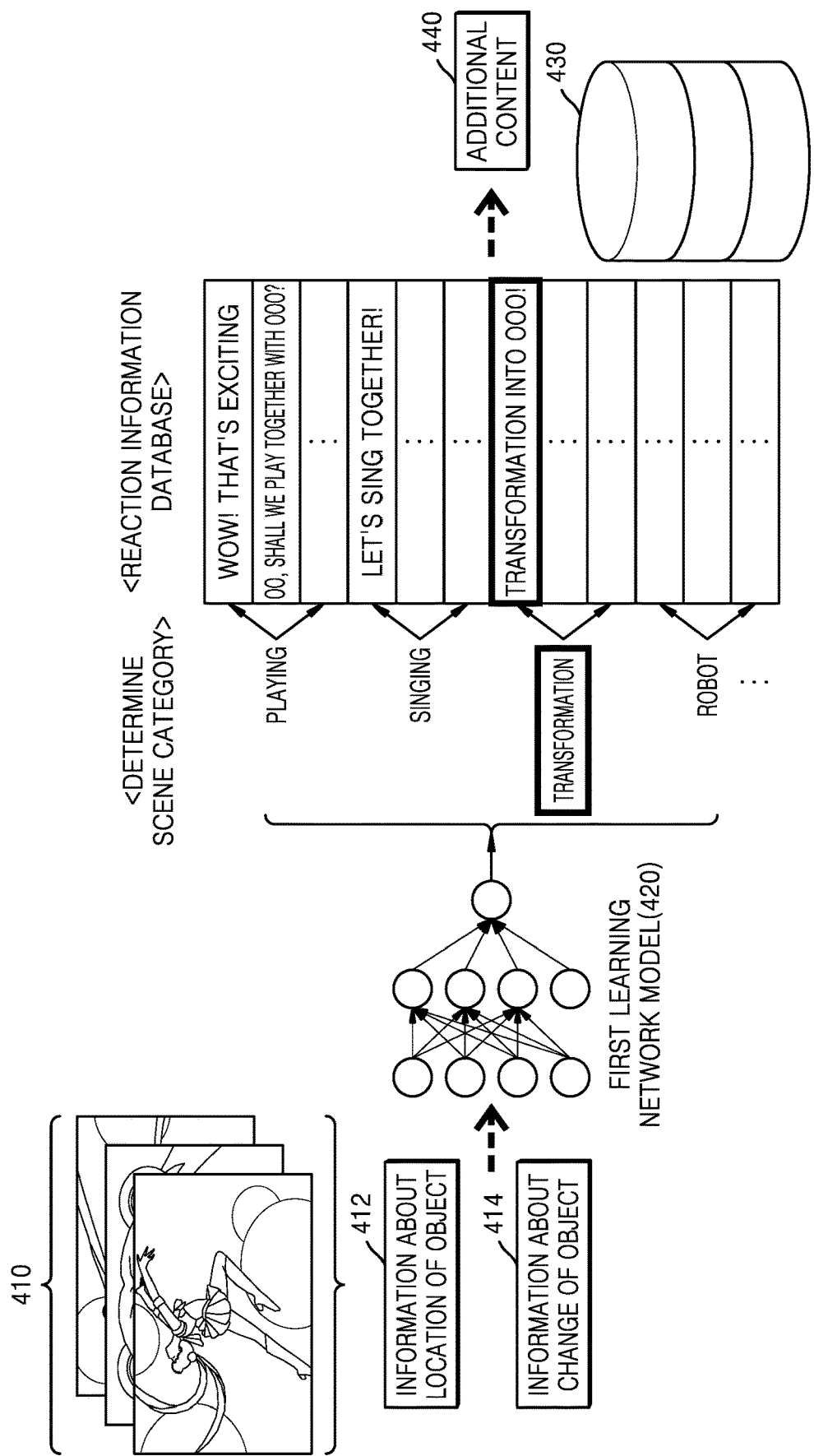
FIG. 4 is a view for describing a method, performed by a terminal, of determining a scene category of an image by using a learning network model based on information about a location of an object of the image and information about a change of an object of the image.

FIG. 4 is a view for describing a method, performed by a terminal, of determining a scene category of an image by using a learning network model based on information about a location of an object of the image and information about a change of an object of the image.

Referring to FIG. 4, the terminal may obtain information 412 about a location of an object and information 414 about a change of an object, from a plurality of images 410 included in content. A method, performed by the terminal, of obtaining the information 412 about the location of the object and the information 414 about the change of the object from the plurality of images 410 may correspond to the method described with reference to operations S310 through S330 of FIG. 3.

The terminal may apply the information 412 about the location of the object and the information 414 about the change of the object to a first learning network model 420 as input data. Here, the first learning network model 420 may be generated by being trained with respect to a standard for determining a scene category of an image from information about a location of one or more objects and information about a change of the one or more objects. In this case, the first learning network model 420 may be a pre-established model. For example, the first learning network model 420 may be a model that is pre-established to receive basic learning data (for example, information about a location of an object of a sample image and information about a change of the object) and output a scene category of an image.

The terminal may determine a scene category of the plurality of images 410 as a transformation image, according to output data obtained by inputting the information 412 about the location of the object and the information 414 about the change of the object to the first learning network model 420.

The terminal may compare the determined scene category of the images with pieces of information stored in a reaction information database 430 that is pre-stored. The reaction information database 430 may store a plurality of pieces of reaction information classified for each scene category of the images. As a result of the comparison, the terminal may obtain sound data of "transformation into OOO!" as the reaction information corresponding to the transformation image. The terminal may generate additional content 440 including the obtained reaction information.

FIG. 4 describes the example in which the information 412 about the location of the object and the information 414 about the change of the object are applied as the input data of the first learning network model 420. However, it is only an embodiment and sound data in content corresponding to an image may also be applied as input data. For example, sound data including a song, a voice, etc. which are set to be reproduced together at a time point in which one or more images in content are reproduced may also be applied as sound data of the first learning network model 420.

Figure 5:
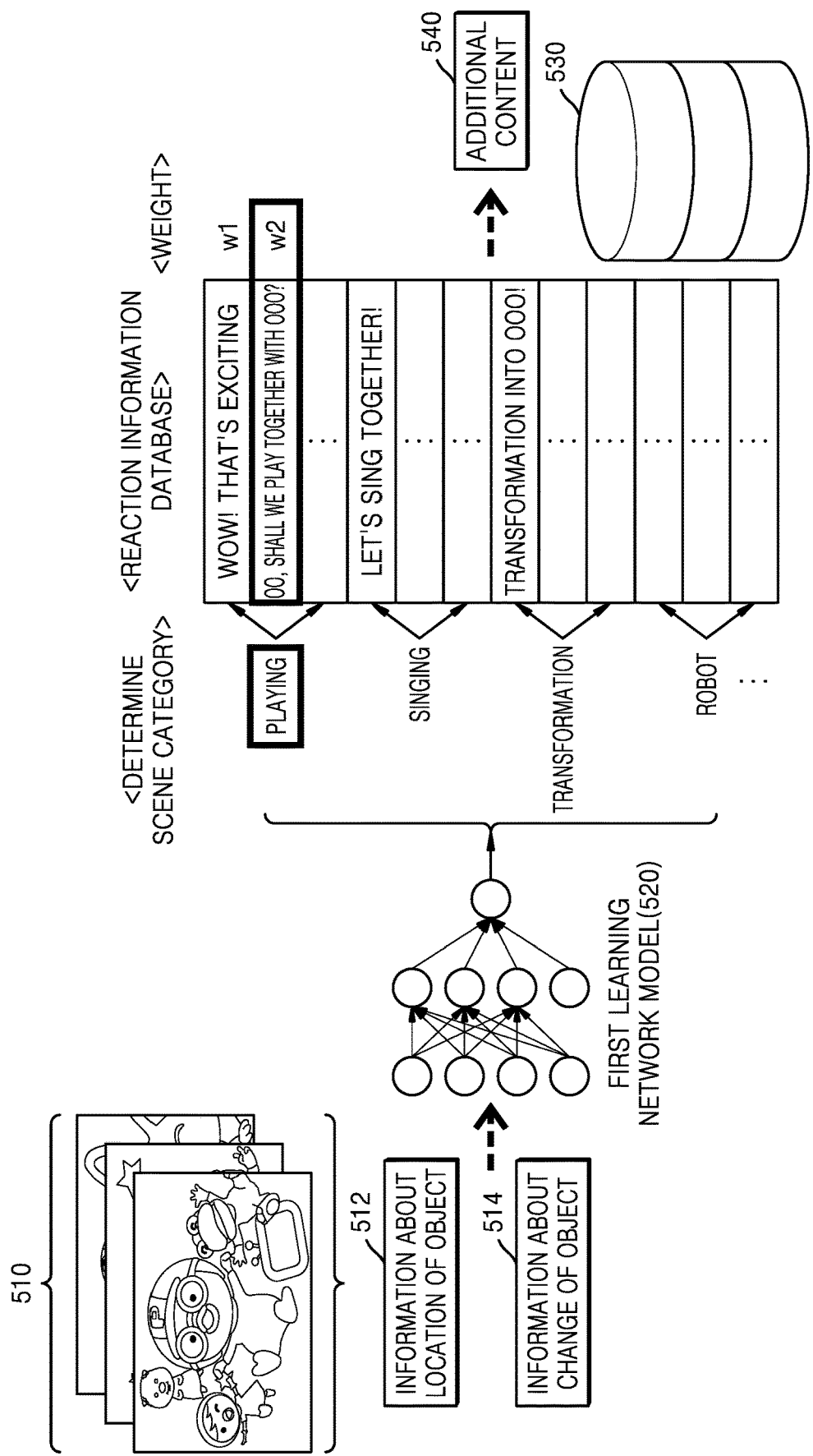
FIG. 5 is a view for describing a method, performed by a terminal, of generating additional content by applying a weight to reaction information according to a situation in which content is provided, according to an embodiment.

FIG. 5 is a view for describing a method, performed by a terminal, of generating additional content by applying a weight to reaction information according to a situation in which content is provided, according to an embodiment.

Referring to FIG. 5, the terminal may obtain information 512 about a location of an object and information 514 about a change of an object, from a plurality of images 510 included in content. A method of obtaining the information 512 about the location of the object and the information 514 about the change of the object from the plurality of images 510 may correspond to the method described with reference to operations S310 through S330 of FIG. 3.

The terminal may apply the information 512 about the location of the object and the information 514 about the change of the object to a first learning network model 520 as input data. Here, the first learning network model 520 may correspond to the first learning network model 420 described above with reference to FIG. 4.

The terminal may determine a scene category of the plurality of images 510 as a playing image, according to output data obtained by inputting the information 512 about the location of the object and the information 514 about the change of the object to the first learning network model 520. Also, the terminal may obtain a plurality of pieces of reaction information corresponding to the playing image, from a reaction information database 530 that is pre-stored.

The terminal may select any one of the plurality of pieces of reaction information, based on content reproducing history. The terminal may set a low weight for reaction information previously reproduced as additional content, from among the plurality of pieces of reaction information. In order to prevent deterioration of user immersion when the same additional content is repeatedly reproduced whenever content is reproduced, the terminal may set the low weight for the reaction information previously determined as the additional content.

For example, the terminal may apply weights w1 and w2 to pieces of reaction information of "Wow! That's exciting" and "OO, shall we play together with OO?", respectively, the pieces of reaction information corresponding to the playing image. Here, it is assumed that the reaction information of "Wow! That's exciting" is previously selected as the additional content. Thus, the weight w1 set for the reaction information of "Wow! That's exciting" may be lower than the weight w2 for the reaction information of "OO, shall we play together with OO?"

The terminal may generate additional content 540 including the reaction information of "OO, shall we play together with OO?" according to a result of selecting one of the plurality of pieces of reaction information based on the set weights.

Figure 6:
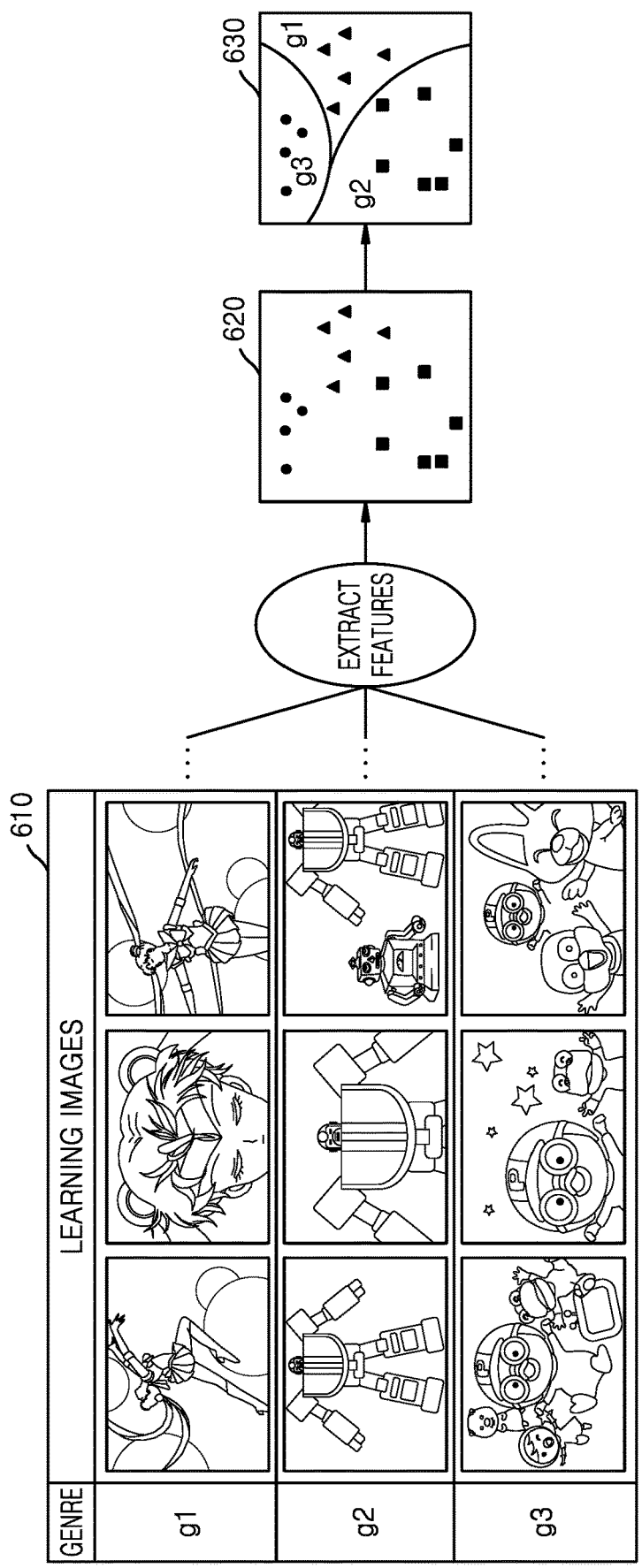
FIG. 6 is a view for describing a method, performed by a terminal, of generating a learning network model taking into account a genre of content, according to an embodiment.

FIG. 6 is a view for describing a method, performed by a terminal, of generating a learning network model taking into account a genre of content, according to an embodiment.

As described above with reference to FIGS. 4 and 5, the terminal may determine a scene category of an image by applying information about a location of an object of the image and information about a change of the object to a learning network model as an input.

The terminal according to an embodiment may generate the learning network model trained with respect to a feature of an image for each genre of content, in order to increase the accuracy of determination of the scene category of the image. The content may have a different plot for each genre. For example, while transformation content may have a plot of an introduction, the occurrence of an event, transformation, and settlement, robot content may have a plot of an introduction, a danger, the appearance of a robot, and confrontation. That is, because each genre of content has a unique plot, when information about the genre of the content is recognized, the scene category of the image that is determined by the terminal may have increased accuracy.

Referring to FIG. 6, the terminal may input learning images 610 for which genres are determined to the learning network model. Here, the learning images 610 may be images included in a plurality of genres g1, g2, and g3, respectively.

The terminal may detect features from the learning images 510 and generate a feature space 620 consisting of the detected features, by using the learning network model. The terminal may learn a standard 630 (illustrated as lines) by analyzing correlation between the features distributed on the feature space 620 and the genres of the learning images 610.

By repeatedly performing the described learning process, the terminal may generate the learning network model for determining a scene category of each image by taking into account the image feature for each genre of the content.

The terminal may obtain the scene category of one or more images as output data, by applying information about a location of an object of the one or more images and information about a change of the object, together with information about a genre of content to the generated learning network model as input data. However, it is only an embodiment, and the input data that is input into the learning network model is not limited thereto.

Figure 7:
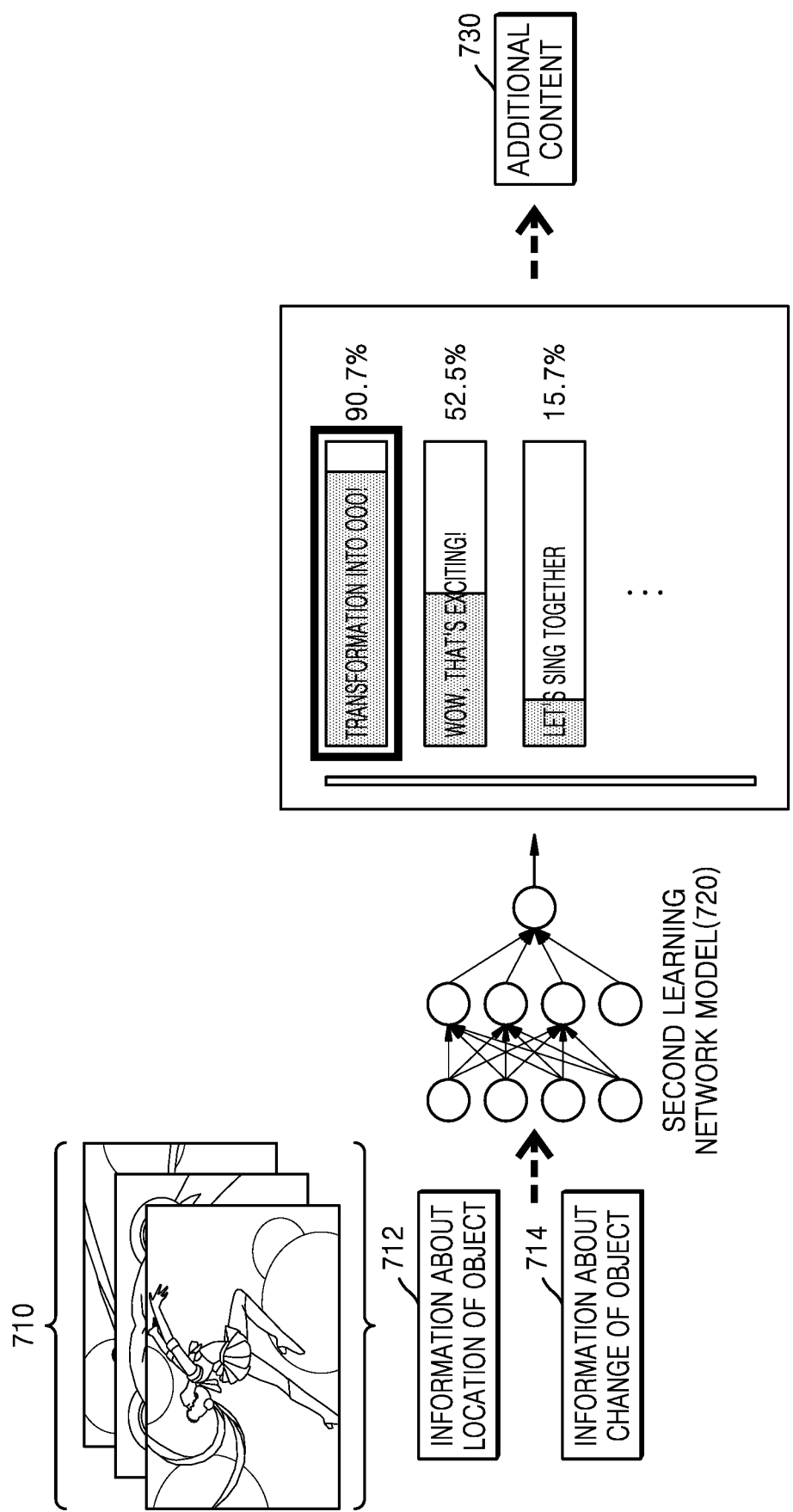
FIG. 7 is a view for describing a method, performed by a terminal, of determining reaction information by using a learning network model based on information about a location of an object of an image and information about a change of an object of the image, according to an embodiment.

FIG. 7 is a view for describing a method, performed by a terminal, of determining reaction information by using a learning network model based on information about a location of an object of an image and information about a change of an object of the image, according to an embodiment.

Referring to FIG. 7, the terminal may obtain information 712 about a location of an object and information 714 about a change of an object, from a plurality of images 710 included in content. A method, performed by the terminal, of obtaining the information 712 about the location of the object and the information 714 about the change of the object from the plurality of images 710 may correspond to the method described with reference to operations S310 through S330 of FIG. 3.

The terminal may apply the information 712 about the location of the object and the information 714 about the change of the object to a second learning network model 720 as input data. Here, the second learning network model 720 may be generated by being trained with respect to a standard for determining the reaction information from information about a location of one or more objects and information about a change of the one or more objects. In this case, the second learning network model 720 may be a pre-established model. For example, the second learning network model 720 may be a model that is pre-established to receive basic learning data (for example, information about a location of an object of a sample image and information about a change of the object) and output the reaction information.

The terminal may determine the reaction information corresponding to an image as sound data of "Transformation into OOO!" according to output data obtained by inputting the information 712 about the location of the object and the information 714 about the change of the object to the second learning network model 720. Here, the output data may be output as a probability value of the reaction information with respect to each of the information 712 about the location of the object and the information 714 about the change of the object that are input. The terminal may generate additional content 740 including the determined reaction information.

FIG. 7 describes the example in which the information 712 about the location of the object and the information 714 about the change of the object are applied as the input data of the first learning network model 720. However, it is only an embodiment and sound data in content corresponding to an image may also be applied as input data.

Figure 8:
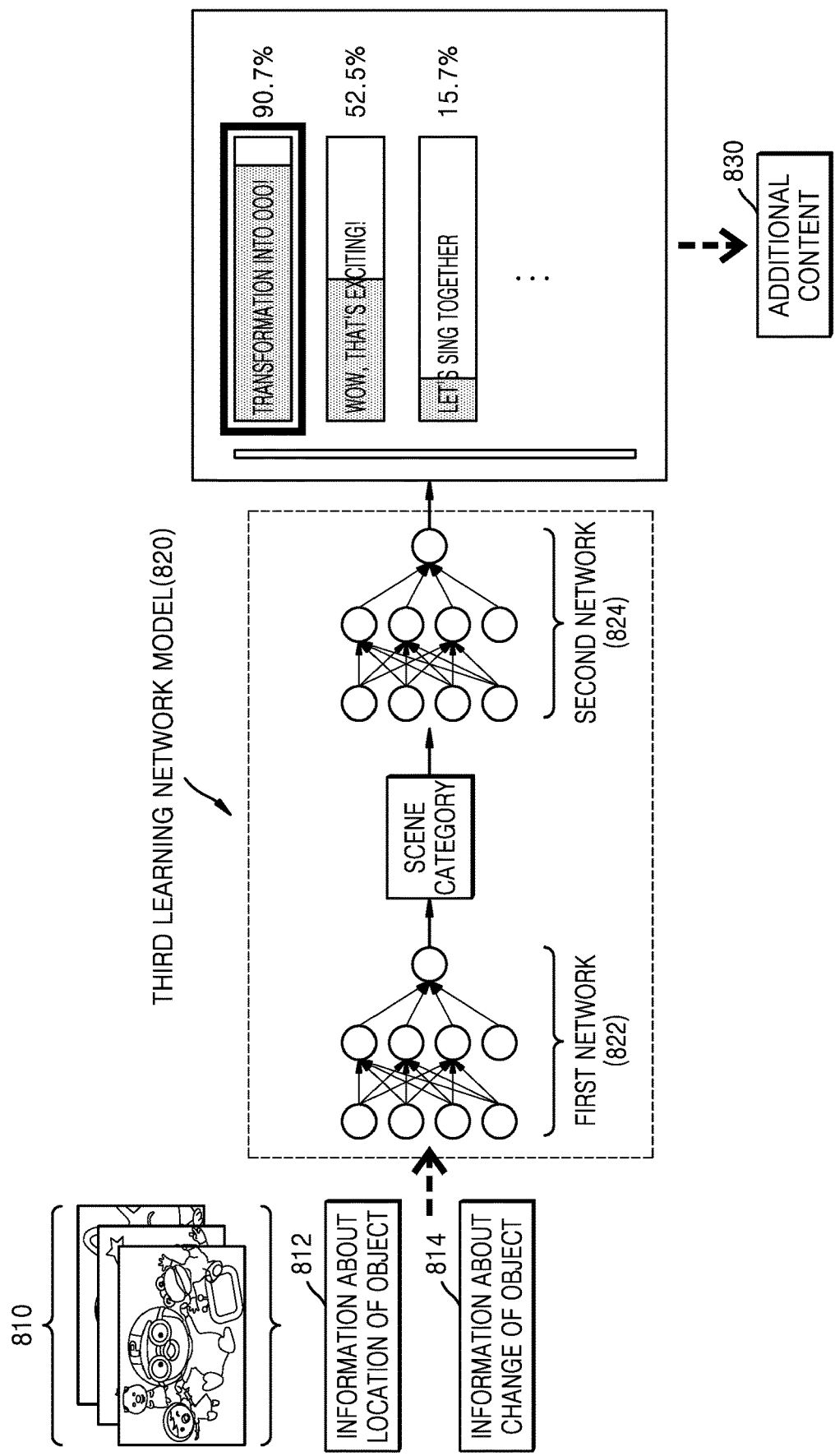
FIG. 8 is a view for describing a method, performed by a terminal, of determining reaction information by using a learning network model based on information about a location of an object of an image and information about a change of an object of the image, according to another embodiment.

FIG. 8 is a view for describing a method, performed by a terminal, of determining reaction information by using a learning network model based on information about a location of an object of an image and information about a change of an object of the image, according to another embodiment.

Referring to FIG. 8, the terminal may obtain information 812 about a location of an object and information 814 about a change of an object, from a plurality of images 810 included in content. A method, performed by the terminal, of obtaining the information 812 about the location of the object and the information 814 about the change of the object from the plurality of images 810 may correspond to the method described with reference to operations S310 through S330 of FIG. 3.

The terminal may apply the information 812 about the location of the object and the information 814 about the change of the object to a third learning network model 820 as input data. The third learning network model 820 may include a first network 822 including a plurality of layers for determining a scene category of the plurality of images 810 and a second network 824 including a plurality of layers for determining reaction information corresponding to the scene category.

According to an embodiment, the terminal may use the first network 822 to detect one or more image features from the information 812 about the location of the object and the information 814 about the change of the object. Here, an image feature detected from each layer of the first network 822 may be different from each other. However, it is not limited thereto. For example, the terminal may use the plurality of layers of the first network 822 to detect at least one of a change in a location of an object, a change in a motion of the object, and a change in a shape of the object from the information 812 about the location of the object and the information 814 about the change of the object. However, it is only an embodiment, and the image features extracted by the first network 822 are not limited thereto.

The terminal may determine the scene category of the image by using pre-stored learning results, by combining (or connecting) the information about the location of the object and the information about the change of the object (or result vectors) by using the first network 822. Also, the terminal may verify the determined scene category of the image.

Also, the terminal may use the second network 824 to detect the reaction information corresponding to the scene category of the image. Information indicating the determined scene category of the image may be applied as an input with respect to the second network 824.

The terminal may reproduce additional content 830 including the reaction information that is output from the third learning network model 820 including the first network 822 and the second network 824, in synchronization with the plurality of images 810.

Figure 9:
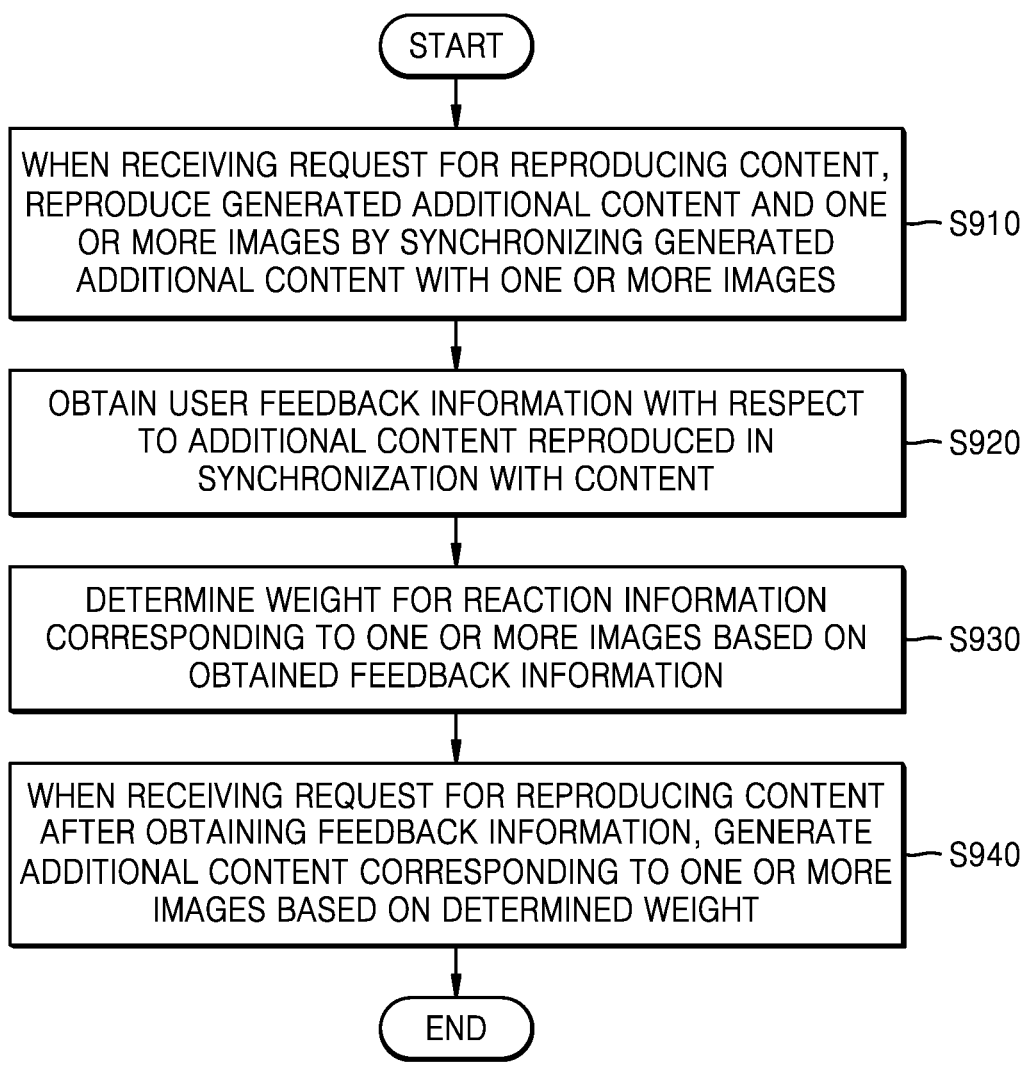
FIG. 9 is a flowchart of a method, performed by a terminal, of modifying and refining additional content based on user feedback information, according to an embodiment.

FIG. 9 is a flowchart of a method, performed by a terminal, of modifying and refining additional content based on user feedback information, according to an embodiment.

In operation S910, when a request for reproducing content is received, the terminal may reproduce generated additional content and one or more images by synchronizing the generated additional content and the one or more images.

Operation S910 may correspond to operation S230 described above with reference to FIG. 2.

In operation S920, the terminal may obtain user feedback information with respect to the additional content reproduced in synchronization with the content. For example, the terminal may obtain user gesture or utterance during the reproduction of the additional content as the feedback information. However, the feedback information is not limited to the described example.

In operation S930, the terminal may determine a weight for reaction information corresponding to the one or more images based on the obtained feedback information.

The terminal may set a high weight for the reaction information, when a user reacts in substantially the same way as the reaction information provided by the additional content, according to a result of analyzing the feedback information. For example, when it is identified that the user shouts according to sound data provided as the reaction information, according to the result of analyzing the feedback information, the terminal may set the high weight for the corresponding reaction information.

Also, when it is determined that the user has a higher response to reaction information with respect to a specific object in the images, according to the result of analyzing the feedback information, the terminal may set the high weight for the reaction information with respect to the specific object. For example, when, with respect to character A and character B included in the images, a user response to the reaction information of "Shall we play together with character B?" is higher than a user response to the reaction information of "Shall we play together with character A?", the terminal may set a higher weight for the reaction information of "Shall we play together with character B?"

However, it is only an embodiment, and the method, performed by the terminal, of determining the weight for the reaction information is not limited to the described example.

In operation S940, when a request for reproducing content is received after the feedback information is obtained, the terminal may generate the additional content corresponding to the one or more images based on the determined weight. The terminal may modify and refine reaction information having a low weight from among the pieces of reaction information included in the additional content as reaction information having a high weight.

After the terminal reproduces the content and the additional content including the modified and refined reaction information in synchronization with each other, when new feedback information is received, the terminal may repeatedly perform described operations S910 through S940 based on the new feedback information.

Figure 10:
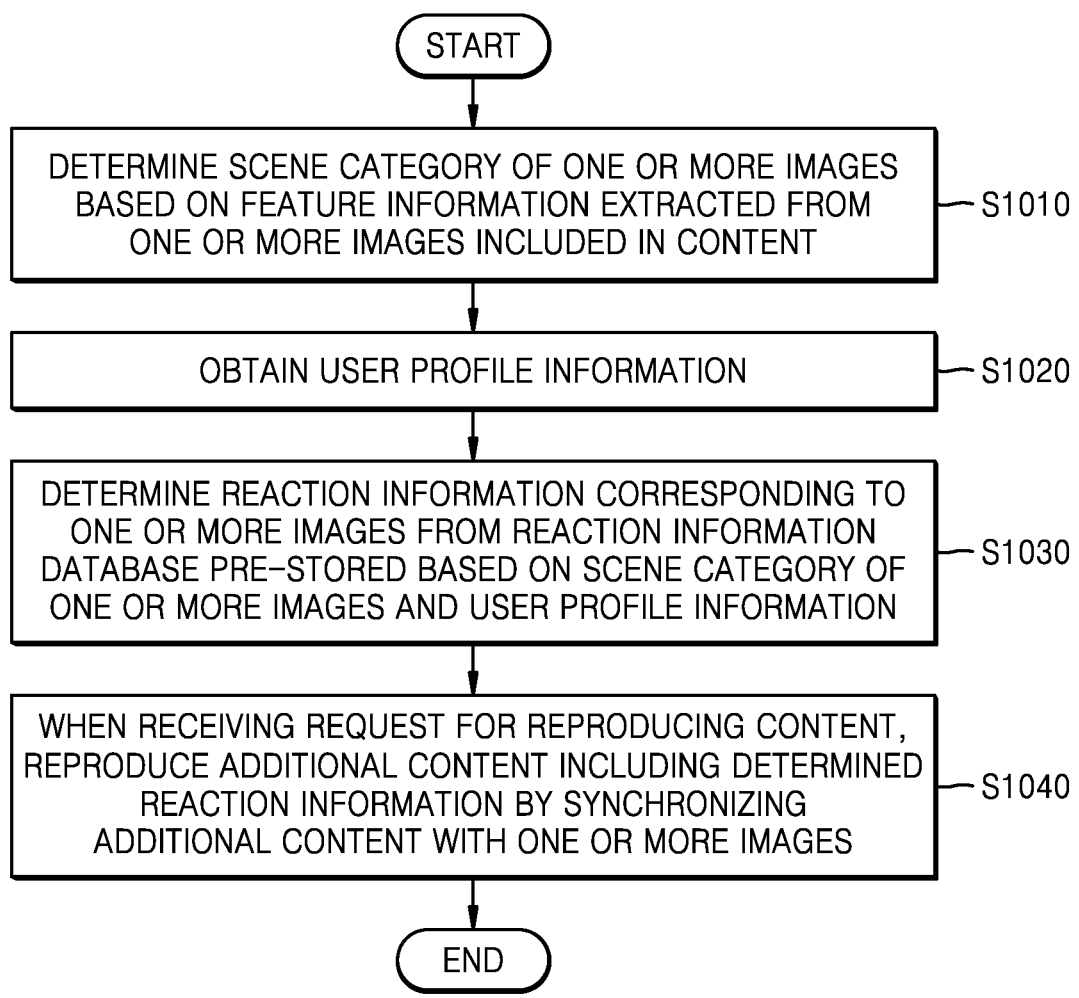
FIG. 10 is a flowchart of a method, performed by a terminal, of generating additional content based on user profile information, according to an embodiment.

FIG. 10 is a flowchart of a method, performed by a terminal, of generating additional content based on user profile information, according to an embodiment.

In operation S1010, the terminal may determine a scene category of one or more images based on feature information extracted from the one or more images included in content.

The terminal may determine the scene category of the one or more images by using a learning network model generated by being trained with respect to a standard for determining a scene category of one or more images from a feature of the one or more images. In this case, the one or more images may be applied as input data or information about a location of an object obtained from the one or more images and information about a change of the object may be applied as the input data.

In operation S1020, the terminal may obtain information about a user profile. Here, the user profile may include information about an age, a gender, jobs, hobbies, preferences, etc. of a user. The terminal may obtain the information about the user profile by receiving the user profile stored in an SNS account, etc. with user approval, or by directly receiving a user input.

However, it is only an embodiment, and the method, performed by the terminal, of obtaining the information about the user profile is not limited to the example described above.

In operation S1030, the terminal may determine reaction information corresponding to the one or more images from a reaction information database that is pre-stored, based on the scene category of the one or more images and the information about the user profile. The reaction information database may store a plurality of pieces of reaction information classified for each scene category of the image.

The terminal may obtain a plurality of pieces of reaction information corresponding to the scene category of the image determined from the reaction information database. Also, the terminal may select reaction information appropriate for a user from among the plurality of pieces of reaction information, based on the information about the user profile. For example, when the user is female and when the plurality of pieces of reaction information include reaction information with respect to an object preferred by female users, the terminal may select this reaction information as the reaction information corresponding to the one or more images. However, it is only an embodiment, and the method of determining the reaction information based on the information about the user profile is not limited to the example described above.

In operation S1040, when a request for reproducing content is received, the terminal may reproduce additional content including the determined reaction information and the one or more images by synchronizing the additional content and the one or more images.

Operation S1040 may correspond to operation S230 described above with reference to FIG. 2.

Figure 11:
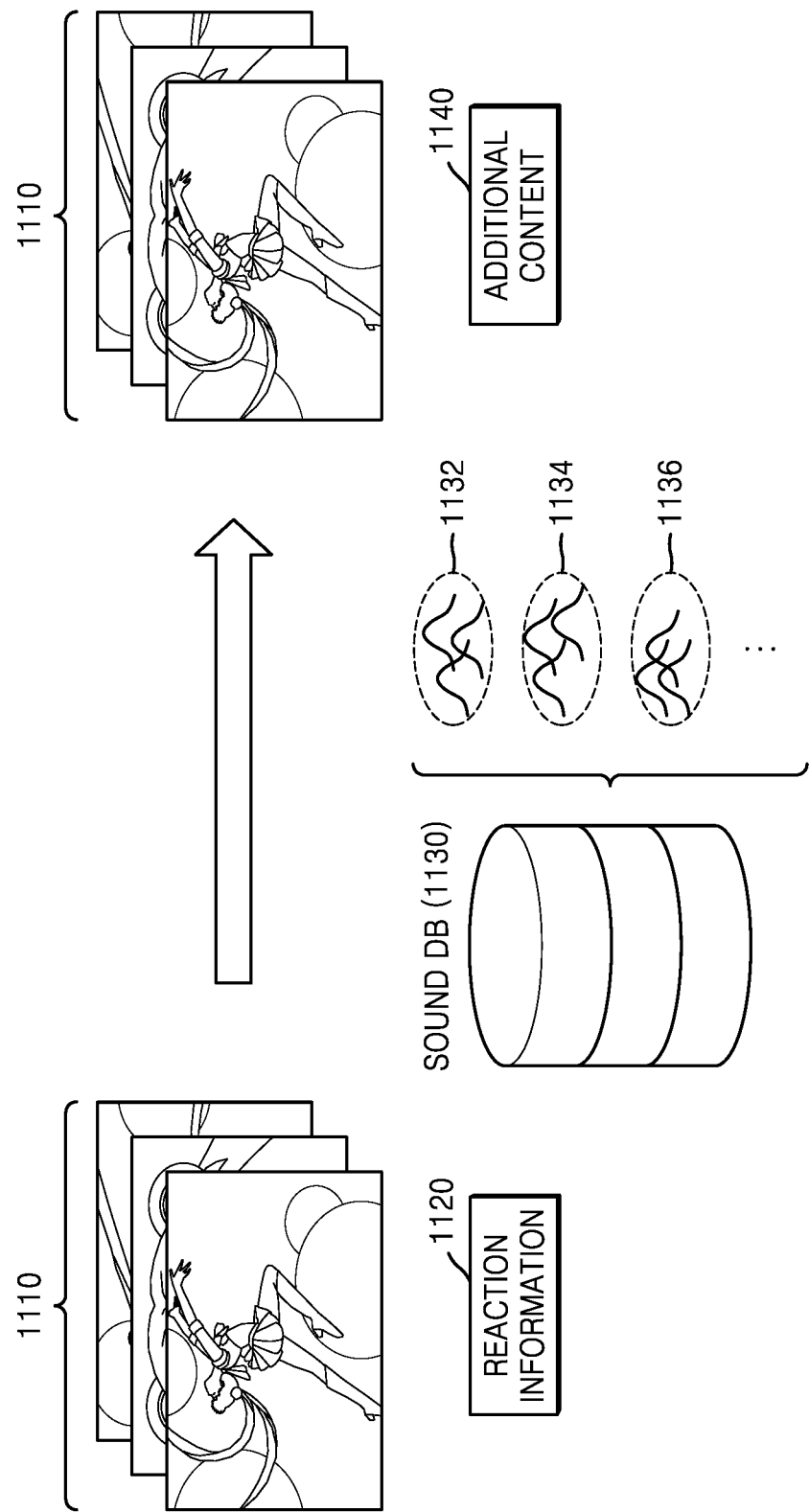
FIG. 11 is a view for describing a method, performed by a terminal, of providing additional content by applying a voice model to reaction information, according to an embodiment.

FIG. 11 is a view for describing a method, performed by a terminal, of providing additional content by applying a voice model to reaction information, according to an embodiment.

Referring to FIG. 11, the terminal may determine reaction information 1120 corresponding to one or more images 1110, by using any one of the methods described above with reference to FIGS. 1 through 10.

The terminal according to an embodiment may apply a specific sound model (for example, 1132) to the reaction information 1120, in order to more effectively provide the determined reaction information 1120 to a user. For example, the terminal may apply any one of sound models, such as an acquaintance of the user, a favorite actor/actress of the user, and a favorite character of the user, to the reaction information 1120 and provide the reaction information 1120 to additional content 1140.

The terminal may pre-store a sound database 1130 including a plurality of sound models 1132, 1134, and 1136. The terminal may provide the additional content 1140 by using a sound model preferred by the user from among the plurality of sound models 1132, 1134, and 1136 stored in the sound database 1130. The terminal may increase user immersion with respect to content, by providing the additional content 1140 by using the sound model preferred by the user.

Information about the sound model preferred by the user may be obtained by using the feedback information as described above with reference to FIG. 9 and may also be obtained by using the information about the user profile as described above with reference to FIG. 10.

Figure 12:
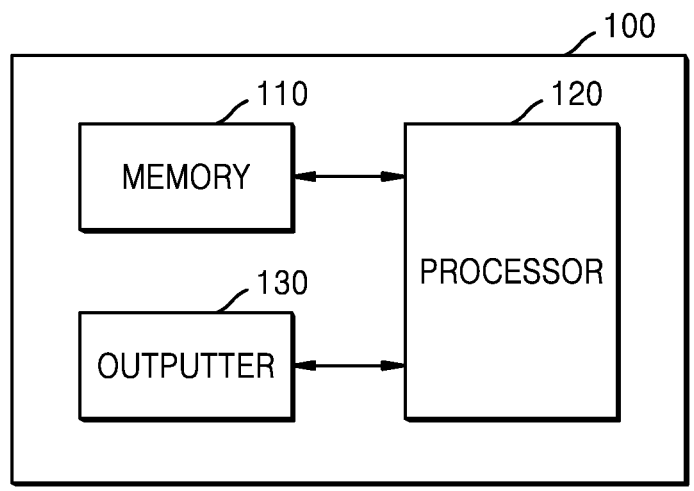
FIG. 12 is a block diagram of a terminal for providing content, according to an embodiment.

FIG. 12 is a block diagram of the terminal 100 for providing content, according to an embodiment.

Referring to FIG. 12, the terminal 100 may include a memory 110, a processor 120, and a display 130.

The memory 110 may store programs (one or more instructions) for processing and controlling of the processor 120. The programs stored in the memory 110 may be divided into a plurality of modules according to functions thereof. According to an embodiment, the memory 110 may include a data learner and a data recognizer to be described below with reference to FIG. 13, the data learner and the data recognizer being realized as software modules. Also, the data learner and the data recognizer each may include a separate learning network model or may share one learning network model.

The processor 120 may include one or more cores (not shown) and one or more graphics processing units (not shown) and/or connection paths (for example, buses, etc.) for transmitting and receiving signals to and from other components According to an embodiment, the processor 120 may perform the operations of the terminal described above with reference to FIGS. 1 through 11.

For example, the processor 120 may obtain one or more images included in content. The processor 120 may obtain feature information from the one or more images included in the content, by using a learning network model.

Also, the processor 120 may determine a scene category of the one or more images by inputting the one or more images, or information about a location of an object of the one or more images and information about a change of the object to the learning network model. As another example, the processor 120 may determine reaction information of the one or more images by inputting the one or more images, or the information about the location of the object of the one or more images and the information about the change of the object to the learning network model.

The processor 120 according to an embodiment may obtain user feedback information with respect to additional content reproduced in synchronization with the content. The processor 120 may provide the additional content by modifying and refining the reaction information corresponding to the one or more images based on the feedback information.

The processor 120 according to an embodiment may obtain information about a user profile. The processor 120 may determine the reaction information corresponding to the one or more images based on the feature information extracted from the one or more images and the obtained information about the user profile.

The processor 120 may further include random-access memory (RAM) (not shown) and read-only memory (ROM) (not shown) temporarily and/or permanently storing signals (or data) processed in the processor 120. Also, the processor 120 may be realized in the form of a system on chip (SoC) including at least one of a graphics processor, RAM, and ROM.

The display 130 may display the one or more images included in the content. Also, the display 130 may display the additional content synchronized with the content, when the generated additional content has the form of an image or text.

Figure 13:
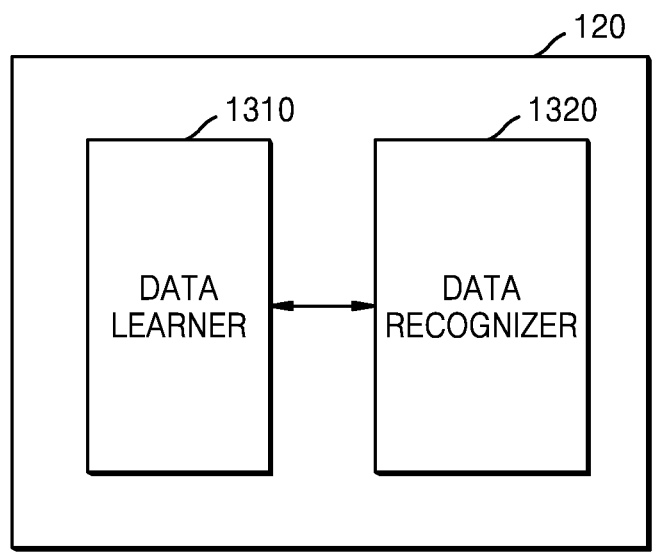
FIG. 13 is a view for describing a processor according to an embodiment.

FIG. 13 is a block diagram for describing the processor 120 according to an embodiment.

Referring to FIG. 13, the processor 120 according to an embodiment may include a data learner 1310 and a data recognizer 1320.

The data learner 1310 may learn a standard for determining the scene category of the one or more images. Also, according to another embodiment, the data learner 1310 may learn a standard for determining the reaction information corresponding to the one or more images.

The data recognizer 1320 may determine the scene category of the one or more images or determine the reaction information corresponding to the one or more images, based on the standards learned by using the data learner 1310.

At least one of the data learner 1310 and the data recognizer 1320 may be formed in the form of at least one hardware chip and mounted in the terminal. For example, at least one of the data learner 1310 and the data recognizer 1320 may be formed in the form of an exclusive hardware chip for AI or may be formed as part of a previous general-purpose processor (for example, a central processing unit (CPU) or an application processor) or a graphics exclusive processor (for example, a graphics processing unit (GPU)) and mounted in various terminals described above.

In this case, the data learner 1310 and the data recognizer 1320 may be mounted in one terminal or each may be mounted in a different terminal. For example, one of the data learner 1310 and the data recognizer 1320 may be included in the terminal and the other may be included in a server. Also, the data learner 1310 and the data recognizer 1320 may communicate with each other in a wired or wireless manner to provide model information established by the data learner 1310 to the data recognizer 1320 or provide input data into the data recognizer 1320 to the data learner 1310 as additional learning data.

At least one of the data learner 1310 and the data recognizer 1320 may be realized as a software module. When the at least one of the data learner 1310 and the data recognizer 1320 is realized as a software module (or a program module including instructions), the software module may be stored in a non-transitory computer-readable recording medium. Also, in this case, the at least one software module may be provided by an operating system (OS) or a certain application. Alternatively, a portion of the at least one software module may be provided by the OS and the other portion of the at least one software module may be provided by a certain application.

Figure 14:
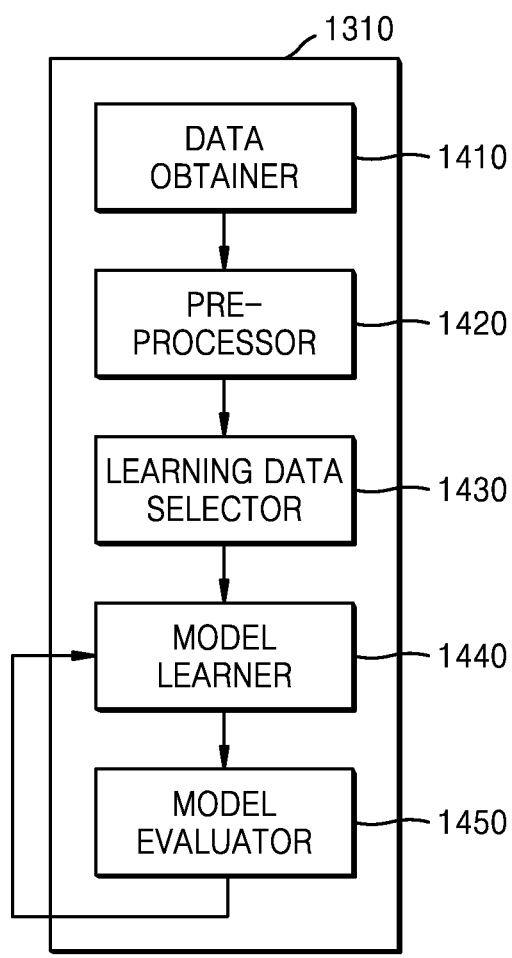
FIG. 14 is a block diagram of a data learner according to an embodiment.

FIG. 14 is a block diagram of the data learner 1310 according to an embodiment.

Referring to FIG. 14, the data learner 1310 according to one or more embodiments may include a data obtainer 1410, a pre-processor 1420, a learning data selector 1430, a model learner 1440, and a model evaluator 1450. However, it is only an embodiment, and the data learner 1310 may include fewer components than the described components, or other components may further be included in the data learner 1310, in addition to the described components.

The data obtainer 1410 may obtain the one or more images included in the content as learning data. For example, the data obtainer 1410 may obtain the one or more images from the terminal including the data learner 1310 or an external terminal capable of communicating with the terminal including the data learner 1310.

The one or more images obtained by the data obtainer 1410 according to an embodiment may be any of the plurality of images included in the content classified according to a genre. For example, for learning, the data obtainer 1410 may obtain one or more images included in at least one piece of content classified according to the genre.

The pre-processor 1420 may pre-process the obtained images such that the obtained images may be used for learning for determining the scene category of the one or more images or determining the reaction information of the one or more images. The pre-processor 1420 may process the obtained one or more images into a predetermined format so that the model learner 1440 to be described below may use the obtained one or more images for learning.

The learning data selector 1430 may select an image required for learning from pre-processed data. The selected image may be provided to the model learner 1440. The learning data selector 1430 may select the image required for learning from the pre-processed images based on a predetermined standard.

The model learner 1440 may learn the standard as to which piece of information from pieces of the feature information of the one or more images from a plurality of layers in the learning network model is to be used in order to determine the scene category of the one or more images or determine the reaction information of the one or more images. For example, the model learner 1440 may learn a first standard indicating from which layer of the plurality of layers included in the learning network model the feature information, which is used to determine the scene category of the one or more images, is to be extracted. Here, the first standard may include the type, the numbers, or the level of features of the one or more images used by the terminal to determine the scene category of the one or more images by using the learning network model.

According to various embodiments, when there are a plurality of pre-established data recognition models, the model learner 1440 may determine a data recognition model having a great relevance between input learning data and basic learning data as the data recognition model for learning. In this case, the basic learning data may be pre-classified into types of the data and the data recognition model may be pre-established for the types of the data. For example, the basic learning data may be pre-classified based on various references, such as a region in which the learning data is generated, a time in which the learning data is generated, a size of the learning data, a genre of the learning data, a generator of the learning data, a type of an object in the learning data, etc.

Also, the model learner 1440 may train the data recognition model by using, for example, reinforcement learning using feedback about whether a scene category of an image or reaction information of the image, which are determined based on learning, is correct or not.

Also, when the data recognition model is trained, the model learner 1440 may store the trained data recognition model. In this case, the model learner 1440 may store the trained data recognition model in the memory of the terminal including the data recognizer 1320. Alternatively, the model learner 1440 may store the trained data recognition model in the memory of the terminal including the data recognizer 1320 to be described below. Alternatively, the model learner 1440 may store the trained data recognition model in a memory of a server connected with the terminal in a wired or wireless network.

In this case, the memory on which the trained data recognition model is stored may also store, for example, commands or data related to at least another component of the terminal. Also, the memory may store software and/or programs. The programs may include, for example, kernel, middleware, an application programming interface (API) and/or an application program (or an "application").

The model evaluator 1450 may input evaluation data in the data recognition model and when a recognition result output from the evaluation data does not meet a predetermined reference, may have the model learner 1440 re-learn. In this case, the evaluation data may be the data predetermined for evaluating the data recognition model. Here, the evaluation data may include a consistency ratio between a scene category of the images, identified based on the learning network model, and an actual scene category of the images. As another example, the evaluation data may include a consistency ratio between reaction information of the images, identified based on the learning network model, and actually appropriate reaction information.

When there are a plurality of learning network models, the model evaluator 1450 may evaluate whether each of the learning network models satisfies a certain criteria and may determine a model satisfying the certain criteria as an ultimate learning network model.

Moreover, at least one of the data obtainer 1410, the pre-processor 1420, the learning data selector 1430, the model learner 1440, and the model evaluator 1450 in the data learner 1310 may be formed in the form of at least one hardware chip and may be mounted in the terminal. For example, at least one of the data obtainer 1410, the pre-processor 1420, the learning data selector 1430, the model learner 1440, and the model evaluator 1450 may be formed in the form of an exclusive hardware chip for AI, or may be formed as a part of a previous general-purpose processor (for example, a CPU or an application processor) or a graphics exclusive processor (for example, a GPU) and may be mounted in various terminals described above.

Also, the data obtainer 1410, the pre-processor 1420, the learning data selector 1430, the model learner 1440, and the model evaluator 1450 may be mounted in one terminal or each may be mounted in a separate terminal. For example, some of the data obtainer 1410, the pre-processor 1420, the learning data selector 1430, the model learner 1440, and the model evaluator 1450 may be included in the terminal and the others may be included in a server.

Also, at least one of the data obtainer 1410, the pre-processor 1420, the learning data selector 1430, the model learner 1440, and the model evaluator 1450 may be realized as a software module. When the at least one of the data obtainer 1410, the pre-processor 1420, the learning data selector 1430, the model learner 1440, and the model evaluator 1450 is realized as a software module (or a program module including instructions), the software module may be stored in a non-transitory computer-readable recording medium. Also, in this case, the at least one software module may be provided by an operating system (OS) or a certain application. Alternatively, a portion of the at least one software module may be provided by the OS and the other portion of the at least one software module may be provided by a certain application.

Figure 15:
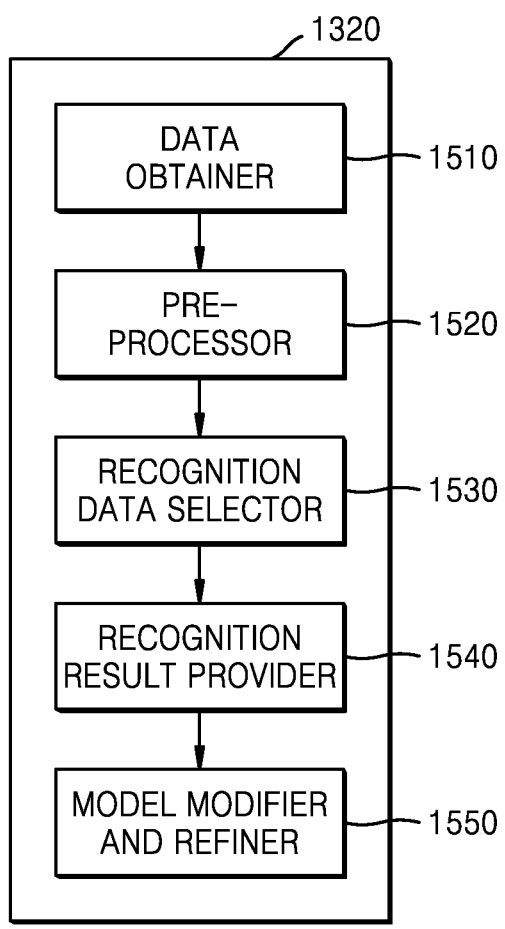
FIG. 15 is a block diagram of a recognizer according to an embodiment.

FIG. 15 is a block diagram of the data recognizer 1320 according to an embodiment.

Referring to FIG. 15, the data recognizer 1320 according to one or more embodiments may include a data obtainer 1510, a pre-processor 1520, a recognition data selector 1530, a recognition result provider 1540, and a model modifier and refiner 1550.

The data obtainer 1510 may obtain one or more images required for determining a scene category of an image or reaction information of the image, and the pre-processor 1520 may pre-process the obtained one or more images so that the obtained one or more images may be used for determining the scene category of the image or the reaction information of the image. The pre-processor 1520 may process the obtained image into a predetermined format so that the recognition result provider 1540 to be described below may use the obtained image to determine the scene category of the image or the reaction information of the image. The recognition data selector 1530 may select an image required for determining the scene category of the image or the reaction information of the image from the pre-processed data. The selected data may be provided to the recognition result provider 1540.

The recognition result provider 1540 may apply the selected image to the learning network model according to an embodiment to determine the scene category of the image or the reaction information of the image. A method of inputting at least one image to the learning network model and determining a scene category or reaction information of the at least one image may correspond to the methods described above with reference to FIGS. 1 through 11.

The recognition result provider 1540 may provide information about the scene category or the reaction in formation of an image, with respect to at least one image.

Based on evaluation about a result of determining the scene category or the reaction information of the images provided by the recognition result provider 1540, the model modifier and refiner 1550 may provide information about the evaluation to the model learner 1440 described above with reference to FIG. 14, so that a type classification network included in the learning network model or a parameter of at least one feature extraction layer may be modified and refined.

Moreover, at least one of the data obtainer 1510, the pre-processor 1520, the recognition data selector 1530, the recognition result provider 1540, and the model modifier and refiner 1550 in the data recognizer 1320 may be formed in the form of at least one hardware chip and may be mounted in the terminal. For example, at least one of the data obtainer 1510, the pre-processor 1520, the recognition data selector 1530, the recognition result provider 1540, and the model modifier and refiner 1550 may be formed in the form of an exclusive hardware chip for AI or may be formed as a part of a previous general-purpose processor (for example, a CPU or an application processor) or a graphics exclusive processor (for example, a GPU) and may be mounted in various terminals described above.

Also, the data obtainer 1510, the pre-processor 1520, the recognition data selector 1530, the recognition result provider 1540, and the model modifier and refiner 1550 may be mounted in one terminal or each may be mounted in a separate terminal. For example, some of the data obtainer 1510, the pre-processor 1520, the recognition data selector 1530, the recognition result provider 1540, and the model modifier and refiner 1550 may be included in the terminal and the others may be included in a server.

Also, at least one of the data obtainer 1510, the pre-processor 1520, the recognition data selector 1530, the recognition result provider 1540, and the model modifier and refiner 1550 may be realized as a software module. When the at least one of the data obtainer 1510, the pre-processor 1520, the recognition data selector 1530, the recognition result provider 1540, and the model modifier and refiner 1550 is realized as a software module (or a program module including instructions), the software module may be stored in a non-transitory computer-readable recording medium. Also, in this case, the at least one software module may be provided by an operating system (OS) or a certain application. Alternatively, a portion of the at least one software module may be provided by the OS and the other portion of the at least one software module may be provided by a certain application.

Figure 16:
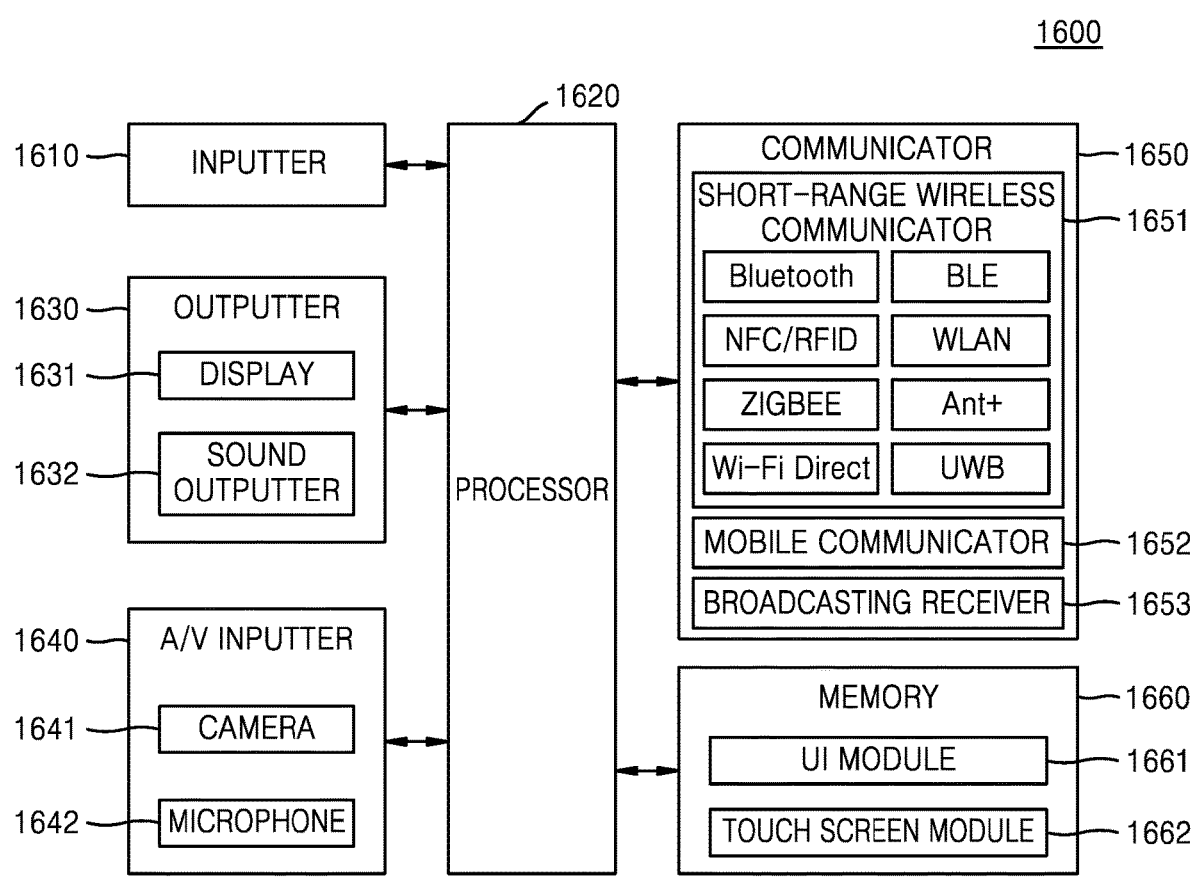
FIG. 16 is a block diagram of a terminal for providing content, according to another embodiment.

FIG. 16 is a block diagram of a terminal 1600 for providing content, according to another embodiment.

Referring to FIG. 16, the terminal 1600 according to an embodiment may further include an inputter 1610, an audio/video (NV) inputter 1640, and a communicator 1650, in addition to a memory 1660, a processor 1620, and an outputter 1630 corresponding to the memory 110, the processor 120, and the display of FIG. 12.

The inputter 1610 denotes a device for a user to input data for controlling the terminal 1600. For example, the inputter 1610 may include a key pad, a dome switch, a touch pad (a touch capacitance method, a pressure resistive method, an infrared detection method, a surface ultrasonic conductive method, a integral tension measuring method, a piezo effect method, etc.), a jog wheel, a jog switch, etc., but it is not limited thereto.

According to an embodiment, the inputter 1610 may receive a user input for requesting reproduction of content, by using a touch pad. However, it is only an embodiment, and the inputter 1610 may receive a user input for requesting reproduction of content from a user via an inputting device, such as a remote controller.

The processor 1620 may, in general, control general operations of the terminal 1600 and signal flows between internal components in the terminal 1000, and process data. For example, the processor 1620 may execute programs (one or more instructions) stored in the memory 1660 to generally control the inputter 1610, the outputter 1630, the A/V inputter 1640, and the communicator 1650.

According to an embodiment, the processor 1620 may determine a scene category of an image and reaction information corresponding to the scene category of the image, by using a learning network model, thereby performing the functions of the terminal 100 described above with reference to FIGS. 1 through 11. Accordingly, the processor 1620 may control the components of the terminal 1600 to determine reaction information corresponding to an image. The processor 1620 corresponds to the processor 120 of FIG. 12, and thus, its detailed description is omitted.

The outputter 1630 may output one or more images in content and additional content in the form of an audio signal or a video signal, and the outputter 1630 may include the display 1631 and the sound outputter 1632.

The display 1631 may display information processed by the terminal 1600. When the display 1631 and a touch pad are layered to form a touch screen, the display 1631 may be used as an inputting device as well as an outputting device.

The sound outputter 1632 may output audio data received from the communicator 1650 or stored in the memory 1660. When the reaction information included in additional content has the form of sound data, the sound outputter 1632 may output the additional content.

The A/V inputter 1640 is a device for an input of an audio signal or a video signal and may include a camera 1641 and a microphone 1642.

The camera 1641 may capture an image within a camera recognition range. According to an embodiment, the image captured by the camera 1641 may be image-processed by the processor 1620 and may be displayed on the display 1631.

The communicator 1650 may include one or more components to enable an external server (for example, an SNS server, a cloud server, a content providing server, etc.) to communicate with other external devices. For example, the communicator 1650 may include a short-range wireless communicator 1651, a mobile communicator 1652, and a broadcasting receiver 1653.

The short-range wireless communicator 1651 may include a Bluetooth communication interface, a Bluetooth low energy (BLE) communication interface, a near-field communication interface, a WLAN (Wi-Fi) communication interface, a Zigbee communication interface, an infrared data association (IrDA) communication interface, a Wi-Fi direct (WFD) communication interface, an ultra wideband (UWB) communication interface, an Ant+ communication interface, etc., but it is not limited thereto.

The mobile communicator 1652 may transmit and receive wireless signals to and from at least one of a base station, an external terminal, and a server, in a mobile communication network. Here, the wireless signals may include various types of data according to exchange of content.

The broadcasting receiver 1653 may receive broadcasting signals and/or information related to broadcasting from the outside via broadcasting channels. According to an embodiment, the terminal 1600 may not include the broadcasting receiver 1653.

According to an embodiment, the communicator 1650 may receive content from an external server and provide the received content to the processor 1620.

The memory 1660 may store programs (for example, one or more instructions, learning network models) for processing and controlling of the processor 1620 and may store data that is input to the terminal 1600 or is output from the terminal 1600.

The programs stored in the memory 1660 may be divided into a plurality of modules according to their functions. For example, the programs may be divided into a UI module 1661, a touch screen module 1662, etc.

The UI module 1661 may provide a specialized UI, a GUI, etc. associated with the terminal 1600 for each application. The touch screen module 1662 may sense a touch gesture of a user on the touch screen and transmit information about the touch gesture to the processor 1620. The touch screen module 1662 according to one or more embodiments of the disclosure may recognize and analyze a touch code. The touch screen module 1662 may be formed as additional hardware including a controller.

The memory 1660 may include a memory of a flash memory type, a hard disk type, a multimedia card micro type, or a card type (for example, an SD or XD memory) and at least one type of storage medium from among random-access memory (RAM), static RAM (SRAM), read-only memory (ROM), electrically erasable programmable ROM (EEPROM), programmable ROM (PROM), magnetic memory, magnetic disks, or optical disks.

The components of the terminal 1600 illustrated in FIG. 16 are according to an embodiment, and each component of the terminal 1600 may be integrated, added, or omitted according to the specification of a terminal that is realized. That is, according to necessity, two or more components may be combined into one component or one component may be divided into two or more components. Also, a function performed by each component (or each module) is described to describe embodiments, and a specific operation or a device related thereto does not limit the scope of the present disclosure.

Figure 17:
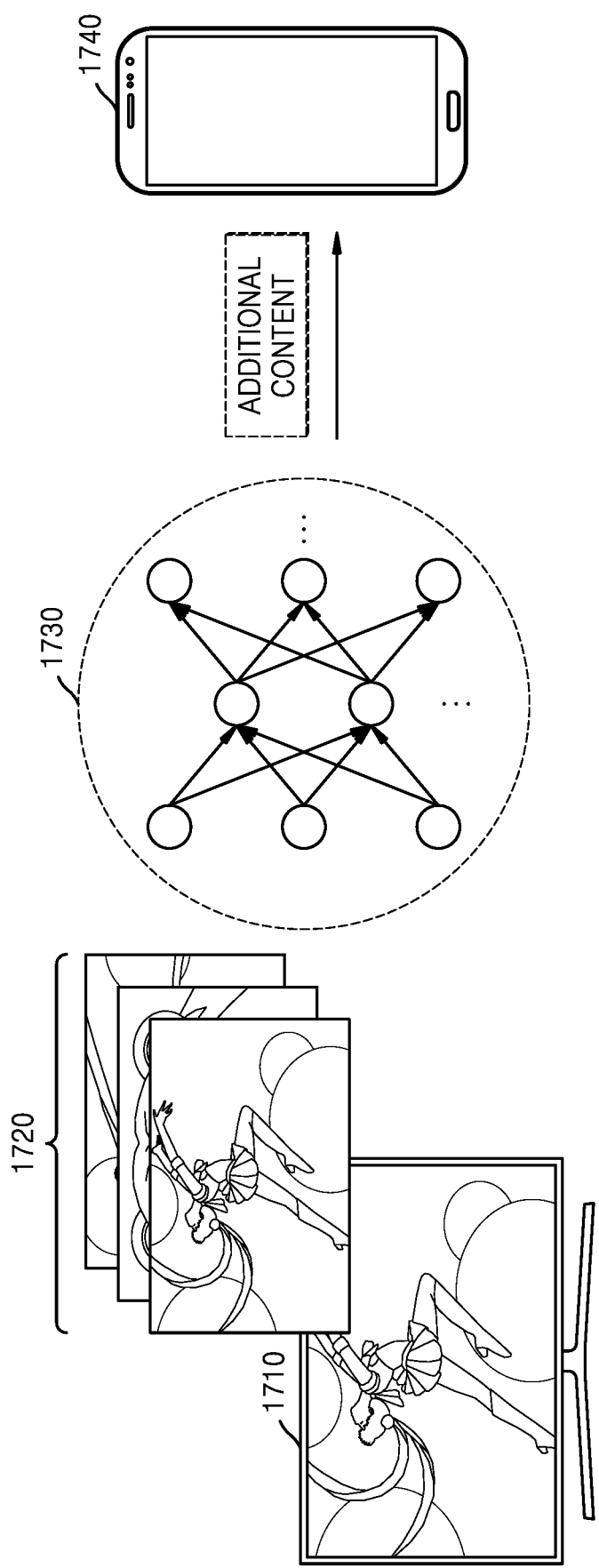
FIG. 17 is a conceptual view of a method, performed by a terminal, of providing additional content, according to another embodiment.

FIG. 17 is a conceptual view of a method, performed by a terminal 1740, of providing additional content, according to another embodiment.

Referring to FIG. 17, a terminal 1710 may generate the additional content by using a learning network model 1730, based on at least one image 1720, according to another embodiment. Here, a method, performed by the terminal 1710, of generating the additional content may correspond to the method described above with reference to FIGS. 1 through 11.

The terminal 1710 may transmit the generated additional content to another terminal 1740. Here, the additional content may include identification information of the at least one image corresponding to reaction information together with the reaction information, in order to synchronize the additional content with content.

When the terminal 1710 reproduces the content, the other terminal 1740 may reproduce the received additional content in synchronization with the content. For example, before the terminal 1710 reproduces the content, the terminal 1710 may transmit, to the other terminal 1740, a control signal for notifying reproduction of the content. Thus, the other terminal 1740 may identify that the reproduction of the content is started and reproduce the additional content in synchronization with the content.

The other terminal 1740 may be a computing device capable of reproducing the additional content and may include, for example, a PC, a laptop, a cellular phone, a micro server, a global positioning system (GPS) device, a smart phone, a wearable terminal, an electronic book terminal, a home appliance device, an electronic device in a vehicle, and other mobile or non-mobile computing devices. However, it is not limited thereto, and the other terminal 1740 may include all types of devices including a communication function and a data processing function.

Also, the terminal 1710 may be connected for communication with the other terminal 1740 via a network. In this case, the network may include a local area network (LAN), a wide area network (WAN), a value added network (VAN), a mobile radio communication network, a satellite network, and a combination thereof, and may be a comprehensive data communication network for enabling smooth communication between the terminal 1710 and the other terminal 1740 and may include the wired Internet, the wireless Internet, and a mobile radio communication network.

Figure 18:
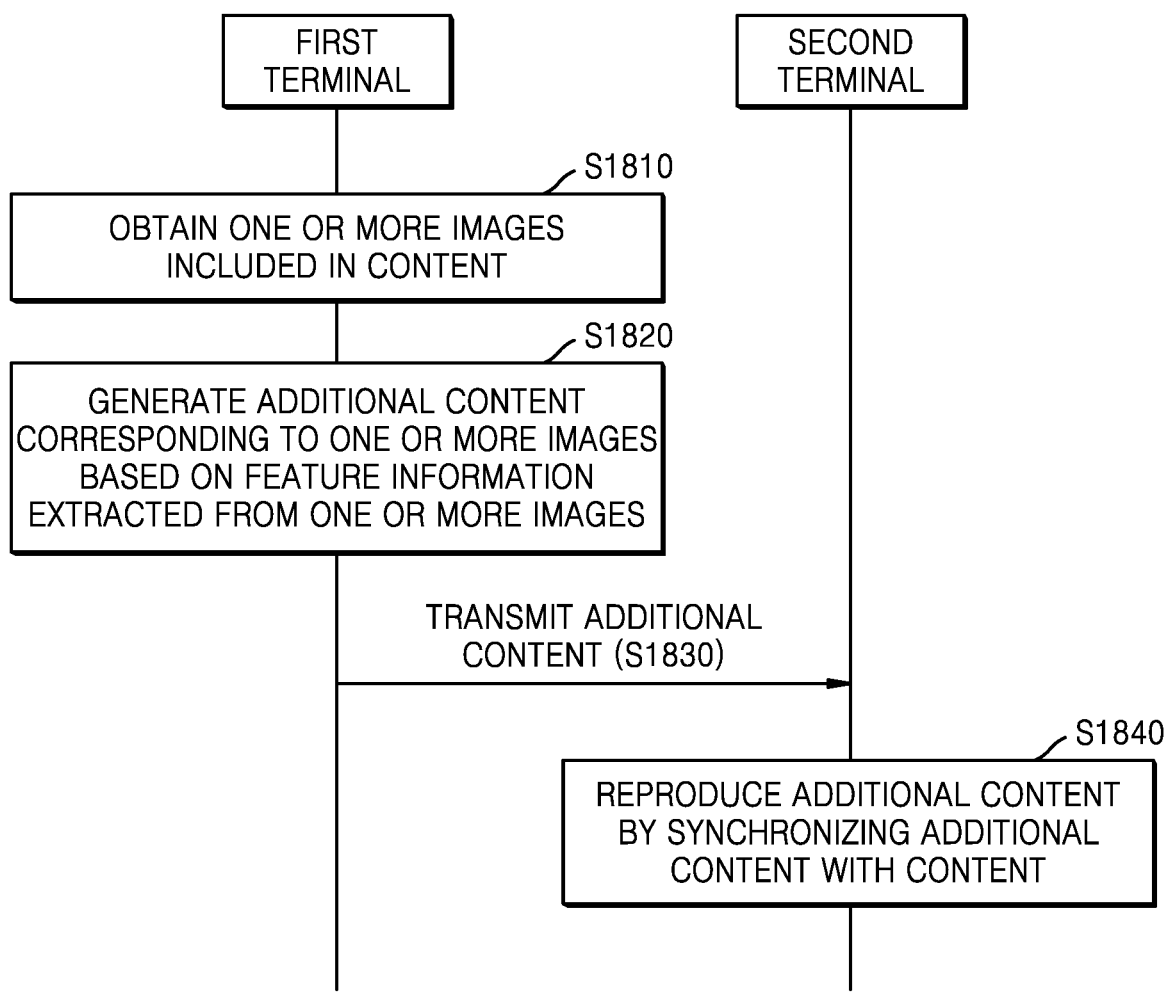
FIG. 18 is a flowchart of a method, performed by a first terminal and a second terminal, of providing content, according to another embodiment.

FIG. 18 is a flowchart of a method, performed by a first terminal and a second terminal, of providing content, according to another embodiment.

In operation S810, the first terminal may obtain one or more images included in the content.

Operation S1810 may correspond to operation S210 described above with reference to FIG. 2.

In operation S1820, the first terminal may generate additional content corresponding to the one or more images, based on feature information extracted from the one or more images.

Operation S1820 may correspond to operation S220 described above with reference to FIG. 2.

In operation S1830, the first terminal may transmit the generated additional content to the second terminal. The first terminal may be communicatively connected with the second terminal through a network. The first terminal may transmit the additional content to the second terminal through a network.

However, it is only an embodiment, and the first terminal may store the generated additional content in a cloud server and may transmit URL information indicating a location in the cloud server, in which the generated additional content is stored, to the second terminal.

In operation S1840, the second terminal may reproduce the received additional content in synchronization with the content. When the second terminal receives a control signal indicating that the content is reproduced at the first terminal, the second terminal may reproduce the additional content in synchronization with the reproduction of the content.

The afore-described embodiments of the present disclosure may be implemented as an executable program, and may be executed by a general-purpose digital computer that runs the program by using a computer-readable recording medium.

The computer-readable recording medium includes storage media, such as magnetic storage media (for example, ROM, floppy disks, hard disks, etc.), optical reading media (for example, CD-ROM, DVD, etc.), and carrier waves (for example, transmission through the Internet).

Although the embodiments of the present disclosure are described herein with reference to the accompanying drawings, one of ordinary skill in the art could understand that the embodiments may be implemented in other specific forms without changing the technical concept or essential characteristics of the present disclosure. Therefore, the embodiments described above should be interpreted as examples and not limitative in all aspects.

The invention claimed is:

1. A method of providing content, the method comprising:
obtaining one or more images included in the content;
generating additional content for guiding user reaction corresponding to the one or more images, based on feature information extracted from the one or more images;
when receiving a request for reproducing the content, synchronizing the generated additional content with the one or more images; and
reproducing the content and the additional content, according to a result of the synchronizing,
wherein the additional content is reproduced in synchronization with the one or more images at a time point at which the one or more images is reproduced.

2. The method of claim 1, wherein the generating of the additional content comprises:

recognizing an object included in the one or more images, based on the extracted feature information;
obtaining, from the one or more images, information about a location of the recognized object and information about a change of the recognized object between the one or more images; and
determining reaction information corresponding to the one or more images, based on the obtained information about the location of the recognized object and the obtained information about the change of the recognized object between the one or more images.

3. The method of claim 1, wherein the generating of the additional content comprises:
determining a scene category of the one or more images, based on the extracted feature information, by using a pre-generated learning network model; and
obtaining, from a reaction information database, reaction information corresponding to the determined scene category.

4. The method of claim 1, wherein the generating of the additional content comprises determining reaction information corresponding to the one or more images, based on the extracted feature information, by using a pre-generated learning network model.

5. The method of claim 1, further comprising:
obtaining user feedback information with respect to the additional content that is reproduced in synchronization with the content;
determining a weight for each of a plurality of pieces of pre-stored reaction information, based on the obtained user feedback information; and
modifying and refining, based on the determined weight, reaction information corresponding to the one or more images, from among the plurality of pieces of pre-stored reaction information.

6. The method of claim 1, further comprising:
obtaining history information of reaction information selected with respect to the one or more images;
determining a weight for each of a plurality of pieces of pre-stored reaction information, based on the history information; and
modifying and refining, based on the determined weight, the reaction information corresponding to the one or more images, from among the plurality of pieces of pre-stored reaction information,
wherein the weights for the plurality of pieces of pre-stored reaction information are set to be lower as a number of times the plurality of pieces of pre-stored reaction information are previously selected is decreased.

7. The method of claim 1, further comprising, when reaction information is sound data, selecting a sound model corresponding to the reaction information from a sound database including a plurality of sound models,
wherein the reproducing of the content and the additional content comprises reproducing the additional content, to which the selected sound model is applied, in synchronization with the one or more images.

8. A terminal for providing content, the terminal comprising:
a memory storing one or more instructions;
a display; and
a processor configured to execute the one or more instructions stored in the memory to:
obtain one or more images included in the content;
generate additional content for guiding user reaction corresponding to the one or more images, based on feature information extracted from the one or more images;
when a request for reproducing the content is received, reproduce the generated additional content in synchronization with the one or more images; and
control the display to display the one or more images,
wherein the additional content is reproduced in synchronization with the one or more images at a time point at which the one or more images is reproduced.

9. The terminal of claim 8, wherein the processor is further configured to execute the one or more instructions to:
recognize an object included in the one or more images, based on the extracted feature information;
obtain, from the one or more images, information about a location of the recognized object and information about a change of the recognized object between the one or more images; and
determine reaction information corresponding to the one or more images, based on the obtained information about the location of the recognized object and the obtained information about the change of the recognized object between the one or more images.

10. The terminal of claim 8, wherein the processor is further configured to execute the one or more instructions to:
determine a scene category of the one or more images, based on the extracted feature information, by using a pre-generated learning network model; and
obtain, from a reaction information database, reaction information corresponding to the determined scene category.

11. The terminal of claim 8, wherein the processor is further configured to execute the one or more instructions to determine reaction information corresponding to the one or more images, based on the extracted feature information, by using a pre-generated learning network model.

12. The terminal of claim 8, wherein the processor is further configured to execute the one or more instructions to:
obtain user feedback information with respect to the additional content that is reproduced in synchronization with the content;
determine a weight for each of a plurality of pieces of pre-stored reaction information, based on the obtained user feedback information; and
modify and refine, based on the determined weight, reaction information corresponding to the one or more images, from among the plurality of pieces of pre-stored reaction information.

13. The terminal of claim 8, wherein the processor is further configured to execute the one or more instructions to:
obtain history information of reaction information selected with respect to the one or more images;
determine a weight for each of a plurality of pieces of pre-stored reaction information, based on the history information; and
modify and refine, based on the determined weight, the reaction information corresponding to the one or more images, from among the plurality of pieces of pre-stored reaction information, and
the weights for the plurality of pieces of pre-stored reaction information are set to be lower as a number of times the plurality of pieces of pre-stored reaction information are previously selected is decreased.

14. The terminal of claim 8, wherein the processor is further configured to execute the one or more instructions to:

select a sound model corresponding to reaction information from a sound database including a plurality of sound models, when the reaction information is sound data; and reproduce the additional content, to which the selected sound model is applied, in synchronization with the one or more images.

15. A non-transitory computer-readable recording medium having recorded thereon a program for executing a method comprising:

obtaining one or more images included in content;

generating additional content for guiding user reaction corresponding to the one or more images, based on feature information extracted from the one or more images;

when receiving a request for reproducing the content, synchronizing the generated additional content with the one or more images; and reproducing the content and the additional content, according to a result of the synchronizing, wherein the additional content is reproduced in synchronization with the one or more images at a time point at which the one or more images is reproduced.

* * * * *